(12) United States Patent
Du et al.

(10) Patent No.: US 11,416,450 B1
(45) Date of Patent: Aug. 16, 2022

(54) CLUSTERING DATA MANAGEMENT ENTITIES DISTRIBUTED ACROSS A PLURALITY OF PROCESSING NODES

(71) Applicant: EMC IP Holding Company LLC, Hopkinton, MA (US)

(72) Inventors: Lejin Du, Kanata (CA); Xuan Tang, Hopkinton, MA (US); Oleksandr Babiychuk, Ottawa (CA); Yixuan Wang, Nepean (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/202,531

(22) Filed: Mar. 16, 2021

(51) Int. Cl.
*G06F 16/16* (2019.01)
*G06F 9/50* (2006.01)
*G06F 9/455* (2018.01)

(52) U.S. Cl.
CPC ........ *G06F 16/164* (2019.01); *G06F 9/45558* (2013.01); *G06F 9/5027* (2013.01)

(58) Field of Classification Search
CPC ... G06F 16/164; G06F 9/5027; G06F 9/45558
USPC ....................................................... 707/822
See application file for complete search history.

(56) References Cited

U.S. PATENT DOCUMENTS

| | | | |
|---|---|---|---|
| 9,355,060 B1 * | 5/2016 | Barber ................ | H04L 67/1097 |
| 10,853,337 B2 * | 12/2020 | Barber ................. | G06F 3/0649 |
| 2009/0092252 A1 | 4/2009 | Noll et al. | |
| 2015/0058298 A1 * | 2/2015 | Earl ...................... | G06F 11/202 |
| | | | 707/674 |
| 2017/0337154 A1 * | 11/2017 | Barber ................. | G06F 9/5016 |
| 2019/0230072 A1 | 7/2019 | Murray | |
| 2019/0384929 A1 * | 12/2019 | Noe ...................... | G06F 21/604 |

(Continued)

FOREIGN PATENT DOCUMENTS

WO    2020114377 A1    6/2020

OTHER PUBLICATIONS

Chrysafis, Christos, et al., "FoundationDB Record Layer: A Multi-tenant Structured Datastore", SIGMOD '19, Amsterdam, The Netherlands, Jun. 30-Jul. 5, 2019, pp. 1787-1802.*

(Continued)

*Primary Examiner* — Robert Stevens
(74) *Attorney, Agent, or Firm* — Ryan, Mason & Lewis, LLP

(57) ABSTRACT

An apparatus comprises a processing device configured to receive, at a given data management entity running on a given processing node, a request to create a given cluster of data management entities for a given client. The processing device is also configured to determine membership requirements for the given cluster, to discover additional data management entities running on additional processing nodes, and to select at least one of the additional data management entities for membership in the given cluster based at least in part on the membership requirements. The processing device is further configured to establish a replication relationship for automating sharing of metadata in the given cluster, the metadata comprising access information and location information for data stores where portions of data items of the given client are stored. The processing device is further configured to perform data management functions for the given client utilizing the metadata.

20 Claims, 20 Drawing Sheets

(56) References Cited

U.S. PATENT DOCUMENTS

2020/0304319 A1 9/2020 Wei et al.
2021/0250400 A1* 8/2021 Chu ................. H04L 67/51

OTHER PUBLICATIONS

Dageville, Benoit, et al., "The Snowflake Elastic Data Warehouse", SIGMOD/PODS '16, San Francisco, CA, Jun. 26-Jul. 1, 2016, pp. 215-226.*
Nguyen, Minh Chau, et al., "Prefetching-based metadata management in Advanced Multitenant Hadoop", J. Supercomputing, vol. 75, published online Mar. 27, 2017, pp. 533-553.*
NVM Express, "NVM Express, Revision 1.3," NVM Express, May 1, 2017, 282 pages.
Dell Technologies, "OpenManage Secure Enterprise Key Manger," 2020, 2 pages.
Dell EMC "Dell EMC CloudLink: Key Management and Encryption for VxFlex OS Software-defined, Scale-out SAN," Product Brief, May 2018, 4 pages.
Dell EMC, "Dell EMC CloudLink: Encryption and Key Management for the Agile Enterprise," Solution Brief, 2020, 2 pages.

* cited by examiner

CLUSTERING DATA MANAGEMENT ENTITIES DISTRIBUTED ACROSS A PLURALITY OF PROCESSING NODES

FIELD

The field relates generally to information processing, and more particularly to techniques for managing information processing systems.

BACKGROUND

Information processing systems, such as data centers and other types of information technology (IT) infrastructure including cloud computing platforms, continue to scale in size. For example, some information processing systems increasingly utilize reconfigurable virtual resources to meet changing user needs in an efficient, flexible and cost-effective manner. For example, cloud computing and storage systems implemented using virtual machines have been widely adopted. Other virtual resources now coming into use in information processing systems include Linux containers. Such containers may be used to provide at least a portion of the virtualization infrastructure of a given information processing system. However, significant challenges arise in in managing storage and retrieval of secret data for clients or other users of such information processing systems.

SUMMARY

Illustrative embodiments of the present disclosure provide techniques for clustering data management entities distributed across a plurality of processing nodes.

In one embodiment, an apparatus comprises at least one processing device comprising a processor coupled to a memory. The at least one processing device is configured to perform the step of receiving, at a given one of a plurality of secret management entities running on a given one of a plurality of distributed processing nodes, a request to create a given cluster of secret management entities for a given one of a plurality of clients. The at least one processing device is also configured to perform steps of determining a set of membership requirements for the given cluster of secret management entities, discovering one or more additional ones of the plurality of management entities running on one or more additional ones of the plurality of distributed processing nodes, and selecting at least one of the one or more additional secret management entities for membership in the given cluster of secret management entities based at least in part on the determined set of membership requirements. The at least one processing device is further configured to perform the step of establishing a replication relationship for automating sharing of metadata between the given secret management entity and the selected at least one additional secret management entity. The metadata comprises (i) access information for a subset of a plurality of data stores where portions of one or more secrets of the given client are stored and (ii) location information specifying which of the data stores in the subset of the plurality of data stores store which portions of the one or more secrets of the given client. The at least one processing device is further configured to perform the step of performing one or more secret management functions for the given client utilizing at least a portion of the metadata.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
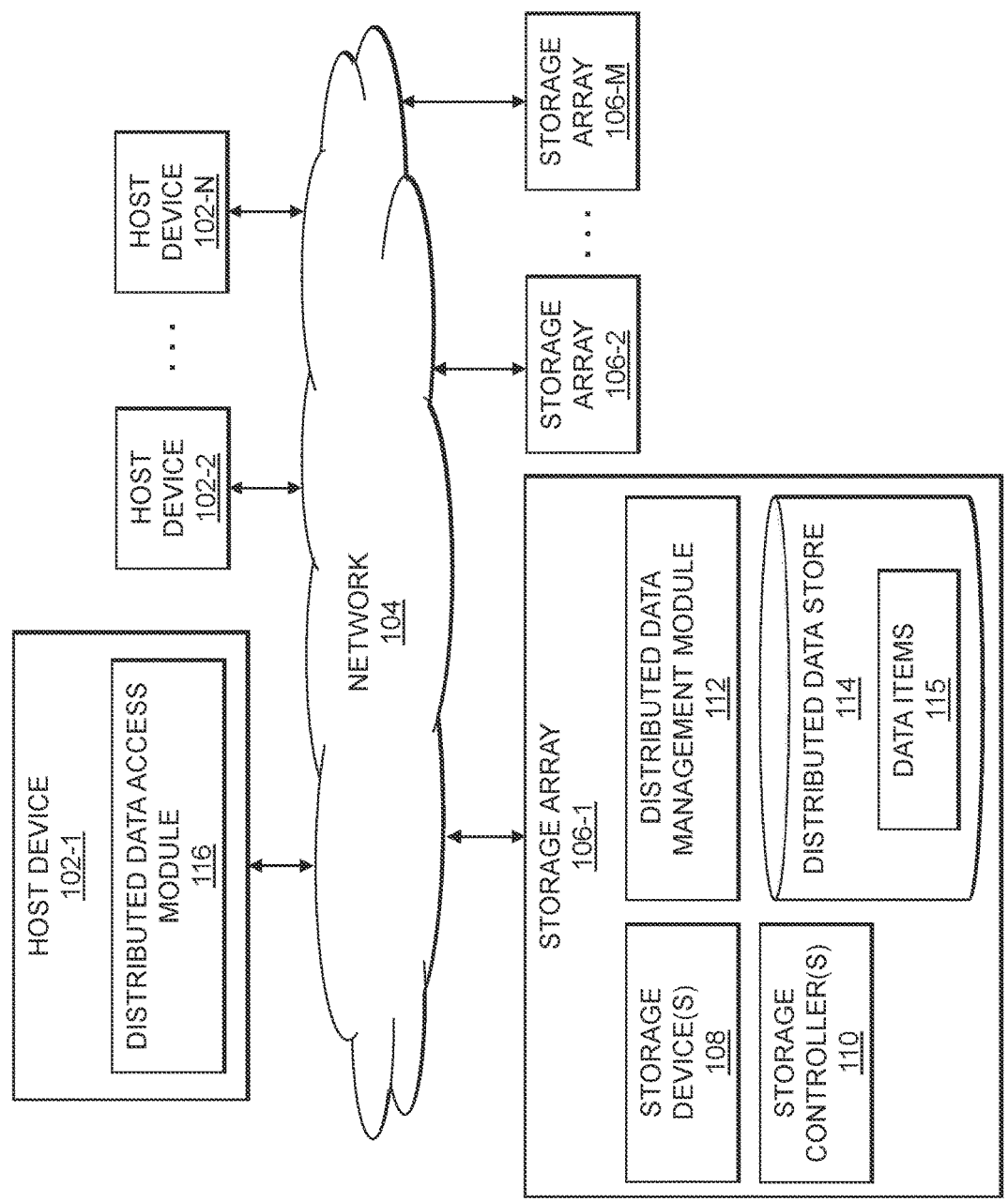
FIG. 1 is a block diagram of an information processing system configured for clustering data management entities distributed across a plurality of processing nodes in an illustrative embodiment.

FIG. 1 shows an information processing system 100 configured in accordance with an illustrative embodiment to provide functionality for clustering data management entities distributed across a plurality of processing nodes. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The information processing system 100 may be viewed as providing at least a portion of what is referred to elsewhere herein as one or more processing platforms. The host devices 102 and storage arrays 106 may collectively provide one or more processing platforms comprising clients or client clusters as described in further detail below. In the information processing system 100, it is desirable to provide data management functionality for one or more data items. In illustrative embodiments, the data items comprise secrets. As used herein, the term "secret" is intended to be broadly construed, and includes information such as keys (e.g., encryption and decryption keys), credentials (e.g., usernames and passwords), credit card and other financial information, personally identifiable information (PII), profile and configuration settings, and various other types of information that is desired to be kept secure and confidential. In the description below, references to "key(s) and secret(s)" should be understood to include one or more keys or other secrets. For example, "key and secret management" may include management of any combination of keys or other types of secrets.

Functionality for key and secret management in the FIG. 1 embodiment is enabled through a distributed data management module 112, a distributed data store 114 that stores one or more data items 115 such as secrets, and a distributed data access module 116.

In the FIG. 1 embodiment, the distributed data management module 112 and distributed data store 114 are implemented on the storage array 106-1, while the distributed data access module 116 is implemented on host device 102-1. In other embodiments, however, the distributed data management module 112 and/or distributed data store 114 may be implemented on the host device 102-1, or the distributed data access module 116 may be implemented on the storage array 106-1. Further, although only single instances of such elements are shown in FIG. 1, other ones of the storage arrays 106-2 through 106-M may implement respective instances of the distributed data management module 112 and the distributed data store 114, as well as potentially instances of the distributed data access module 116. Similarly, other ones of the host devices 102-2 through 102-M may implement respective instances of the distributed data access module 116, and potentially instances of the distributed data management module 112 and/or distributed data store 114.

The distributed data management module 112 is configured to manage metadata for data items 115 (e.g., keys and secrets) which are stored in the distributed data store 114. For example, a given key or secret may be split in multiple parts, with each part being stored in a different key and secret store provided using different instances of the distributed data store 114 (e.g., implemented on different ones of the storage arrays 106). The given key or secret may also have multiple copies stored in different key and secret stores provided using different instances of the distributed data store 114 (e.g., implemented on different ones of the storage arrays 106). In some cases, multiple copies of each of multiple parts of the given key or secret are stored in different key and secret stores provided using different instances of the distributed data store 114 (e.g., implemented on different ones of the storage arrays 106). Illustratively, no single instance of the distributed data store 114 contains all of the parts of a copy of the given key or secret, such that compromise of any one instance of the distributed data store 114 will not result in leaking of keys or secrets.

The metadata stored by the distributed data management module 112 may include key or secret identifiers (IDs), key or secret size or other attributes, key or secret part IDs and their locations in different instances of the distributed data store 114. It should be noted that there are illustratively multiple instances of the distributed data management module 112 that are clustered together, with the metadata for a particular set of keys or secrets stored on behalf of a client or cluster of clients being shared across each of the instances of the distributed data management module 112 that are part of the same cluster.

The distributed data access module 116 is configured to provide an interface for clients or clusters of clients (e.g., users of the host devices 102) to provide key and secret management. To store keys or secrets, the distributed data access module 116 provides a key or secret ID, size and other attributes to the distributed data management module 112. The distributed data management module 112 will determine, based on various policies, whether that key should be split into multiple parts. If so, the distributed data management module 112 will assign key or secret part IDs, and select locations on different instances of the distributed data store 114 where such key or secret parts should be stored. Such information is returned to the distributed data access module 116, which then directly access the different instances of the distributed data store 114 to save the different key or secret parts. By "directly access" it is meant that the distributed data access module 116 does not need to go through the distributed data management module 112. In this way, the distributed data management module 112 is not required to have knowledge of the actual contents of any key or secret, only metadata associated therewith that is used for storing and retrieving keys or secrets.

To retrieve keys or secrets, the distributed data access module 116 provides a key or secret ID to the distributed data management module 112, which will determine a key or secret part list for the key or secret associated with the key or secret ID. The key or secret part list may include key or secret part locations (e.g., the instances of the distributed data store 114 which store copies of each key or secret part)

At least portions of the functionality of the distributed data management module 112, the distributed data store 114 and the distributed data access module 116 may be implemented at least in part in the form of software that is stored in memory and executed by a processor.

Although the distributed data management module 112 and distributed data store 114 are shown as being implemented internal to the storage array 106-1 and outside the storage controllers 110 of the storage array 106-1 in the FIG. 1 embodiment, it should be appreciated that the distributed data management module 112 and distributed data store 114 may be implemented at least in part internal to the storage controllers 110 of the storage array 106-1. Further, the distributed data management module 112 and distributed data store 114 may be implemented at least in part external to both the storage controllers 110 and the storage array 106-1, such as on or using an external server, a cloud-based computing platform, etc. As described above, it should also be appreciated that in some embodiments one or more other ones of the storage arrays 106-2 through 106-M may implement additional instances of the distributed data management module 112 and distributed data store 114, and possibly the distributed data access module 116.

Similarly, although the distributed data access module 116 is shown as being implemented internal to the host device 102-1, the distributed data access module 116 may be implemented at least in part external to the host device 102-1, such as on or using an external server, a cloud-based computing platform, etc. It should also be appreciated that in some embodiments one or more other ones of the host devices 102-2 through 102-N may implement additional instances of the distributed data access module 116 or possibly instances of the distributed data management module 112 and the distributed data store 114.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the host devices 102, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 12 and 13.

It is to be understood that the particular set of elements shown in FIG. 1 for clustering data management entities distributed across a plurality of processing nodes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
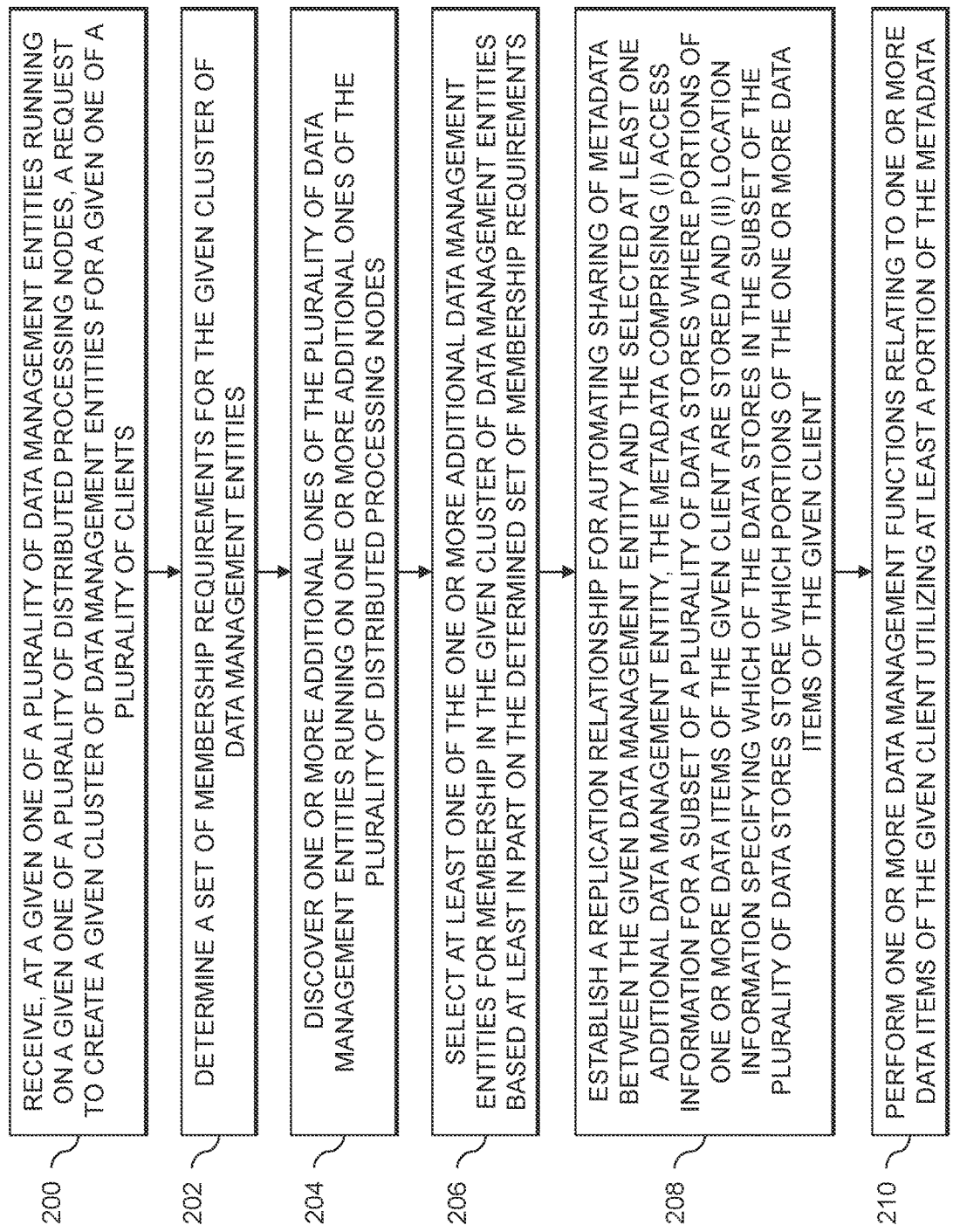
FIG. 2 is a flow diagram of an exemplary process for clustering data management entities distributed across a plurality of processing nodes in an illustrative embodiment.

An exemplary process for clustering data management entities distributed across a plurality of processing nodes will now be described in more detail with reference to the flow diagram of FIG. 2. It is to be understood that this particular process is only an example, and that additional or alternative processes for clustering data management entities distributed across a plurality of processing nodes may be used in other embodiments.

In this embodiment, the process includes steps 200 through 210. These steps are assumed to be performed utilizing one or more of the distributed data management module 112, the distributed data store 114 and the distributed data access module 116. The process begins with step 200, receiving, at a given one of a plurality of data management entities running on a given one of a plurality of distributed processing nodes, a request to create a given cluster of data management entities for a given one of a plurality of clients. The plurality of data management entities are configured to manage storage and retrieval of data items on behalf of the plurality of clients. The data items may comprise one or more keys or other secrets.

A set of membership requirements for the given cluster of data management entities is determined in step 202. The determined set of membership requirements may comprise a requirement that each data management entity in the given data management entity cluster has at least a threshold level of connectivity to each of at least a subset of the other data management entities in the given data management entity cluster. The determined set of membership requirements may also or alternatively comprise a designated amount of available storage, the designated amount of available storage for each data management entity in the given data management entity cluster being based at least on part on a number of different data management entity clusters which that data management entity is a member of, and a maximum number of different data management entity clusters to which each data management entity in the given data management entity cluster may be a member of.

In step 204, one or more additional ones of the plurality of data management entities running on one or more additional ones of the plurality of distributed processing nodes are discovered. At least one of the one or more additional data management entities are selected in step 206 for membership in the given cluster of data management entities based at least in part on the determined set of membership requirements. A replication relationship is established in step 208 for automating sharing of metadata between the given data management entity and the selected at least one additional data management entity. The metadata comprises (i) access information for a subset of a plurality of data stores where portions of one or more data items of the given client are stored and (ii) location information specifying which of the data stores in the subset of the plurality of data stores store which portions of the one or more data items of the given client.

Automating the sharing of the metadata between the given data management entity and the selected at least one additional data management entity may comprise: maintaining, by the given data management entity, a table of changes for a metadata database local to the given data management entity; packaging a set of two or more of the changes in the table of changes into one or more batches of changes; performing, at a first time, synchronous replication of the one or more batches of changes from the given data management entity to one or more other ones of the data management entities in the given data management entity cluster that the given data management entity is able to establish a connection with at the first time; and performing, at a second time subsequent to the first time, asynchronous replication of the one or more batches of changes from the given data management entity to one or more other ones of the data management entities in the given data management entity cluster that that given data management entity is unable to establish the connection with at the first time.

In step 210, one or more data management functions for the given client are performed utilizing at least a portion of the metadata. At least a given one of the one or more data management functions for the given client is performed in step 210 responsive to receiving a request from a given agent associated with the given client. The given agent may also run on the given processing node of the plurality of distributed processing nodes. Step 210 may include controlling replication of one or more secrets of the given client across the data stores in the subset of the data stores in accordance with one or more specified data item replication policies. The one or more specified data item replication policies may comprise at least one of: replicating the one or more data items in data stores of two or more data store availability zones; replicating the one or more data items in data stores in two or more different geographic locations; and a scale of replication of the one or more data items, the scale of replication being based at least in part on at least one of a number of clients associated with the given data management entity cluster, a number of the two or more data store availability zones, and a number of data item parts to which respective ones of the one or more data items are split into.

The request from the given agent associated with the given client may comprise a request to save a given one of the one or more data items, and performing the given data management function for the given client may comprise: receiving, from the given client, a data item identifier associated with the given data item and a size of the given data item; determining, at the given data management entity, whether to split the given data item into two or more data item parts; responsive to determining to split the given data item into the two or more data item parts, selecting two or more of the data stores in the subset of the plurality of data stores on which to store respective copies of each of the two or more data item parts; and providing, to the given client, an indication of which of the two or more data stores in the subset of the plurality of data stores to utilize for storage of the respective copies of each of the two or more data item parts. The request from the given agent associated with the given client may alternatively comprise a request to retrieve a given one of the one or more data items, and performing the given data management function for the given client may comprise: receiving, from the given client, a data item identifier associated with the given data item; determining, at the given data management entity, whether the given data item has been split into two or more data item parts; responsive to determining that the given data item is split into the two or more data item parts, identifying two or more of the data stores in the subset of the plurality of data stores on which respective copies of each of the two or more data item parts are stored; and providing, to the given client, an indication of which of the two or more data stores in the subset of the plurality of data stores store the respective copies of each of the two or more data item parts.

In some embodiments, content of one or more data items of the given client are stored on the subset of the data stores but not data management entities in the given data management entity cluster. The given data management entity cluster may comprise one of a plurality of different data management entity clusters comprising respective different subsets of the plurality of data management entities, each of the plurality of data management entity clusters being associated with at least one of the plurality of clients. The given data management entity may be a member of the given data management entity cluster and at least one other one of the plurality of data management entity clusters.

In some embodiments, the plurality of distributed processing nodes may comprise storage systems in a clustered storage system, and each of at least a subset of the storage systems in the clustered storage system runs one of the plurality of data management entities, implements one of the plurality of data stores, and comprises one of the plurality of clients. At least one of the plurality of data stores may be implemented using one or more storage systems external to the clustered storage system. In other embodiments, each of the plurality of clients may be associated with one of a plurality of hyperconverged infrastructure nodes in a federated hyperconverged infrastructure environment, and the plurality of data management entities and the plurality of data stores may be implemented external to the plurality of hyperconverged infrastructure nodes in the federated hyperconverged infrastructure environment.

Management of certain data items, such as encryption keys and other secrets (e.g., credit card information, passwords or other credentials, profiles, etc.) is an important task in enterprise data centers, and in private and public cloud computing platforms. The processing platforms used to construct data centers and clouds are typically distributed. Conventional key and secret management systems, however, follow an isolated server-client model. Illustrative embodiments provide a distributed key and secret management system (D-KSMS) with dynamic clustering (DC), which advantageously enables key and secret distribution and management across distributed processing platforms. The D-KSMS with DC manages policies and controls operations with high availability (HA) dynamically clustered management entities.

An information technology (IT) infrastructure of an enterprise (e.g., a corporation, business or other entity) may have various compute servers, storage systems and other types of processing platforms across one or many data centers and clouds. A key and secret management system (KSMS) is a critical component in such distributed platforms. The D-KSMS with DC used in illustrative embodiments provides various advantages relative to conventional server-client based key and secret management systems. For example, the D-KSMS with DC is composed of many entities which are distributed across clusters dynamically. Further, the D-KSMS with DC is secure for any users or clients of the clusters, is always on and connected (e.g., there is no single point of failure), and is HA by nature. Further, components of the D-KSMS with DC can be embedded inside distributed processing platforms, or may run externally to such distributed processing platforms. Such flexibility is per-component based as desired for a particular implementation.

Modern data centers and clouds may be constructed with many compute and storage systems or other types of processing platforms. For each processing platform, a KSMS is required for data encryption and secret data management, among other tasks. Key and secret management solutions may be located externally outside of each processing platform, or may be embedded inside. When multiple compute and storage systems or other types of processing platforms are deployed, the key and secret management solution for each processing platform often works in isolation, but such solutions are not able to share information with other processing platforms, are vulnerable to single entity attack, and lack desirable attributes such as HA and scalability by nature.

Conventional key and secret management solutions, which are either embedded inside a client system or located externally, are typically isolated and lack flexibility for sharing metadata and resources with other key and secret management solutions for other client systems. Further, such isolated key and secret management solutions cannot scale to support a large number of clients and manage a large number of keys and secrets. Such isolated key and secret management solutions also limit administration accessibility for policy and operation management, and increase the burden and complexity of data center and cloud management. Further, in an isolated key and secret management solution, a compromised key and secret store gives a perpetrator access to all the keys and secrets stored in its database absent some type of key and secret splitting.

The D-KSMS with DC described herein is able to serve many distributed compute and storage systems and other types of processing platforms. The D-KSMS with DC may be further optimized for managing various critical data, including but not limited to encryption keys and secrets (e.g., login passwords or other credentials, credit card or other financial information, profile and configuration settings, etc.). The D-KSMS with DC in some embodiments is a cross-system design providing a HA key and secret management solution for distributed processing platforms. The distributed processing platforms can be any combination of distributed computing systems, distributed storage systems, virtual and physical data centers, accounts and systems in public and/or private cloud computing platforms, etc.

Figure 3:
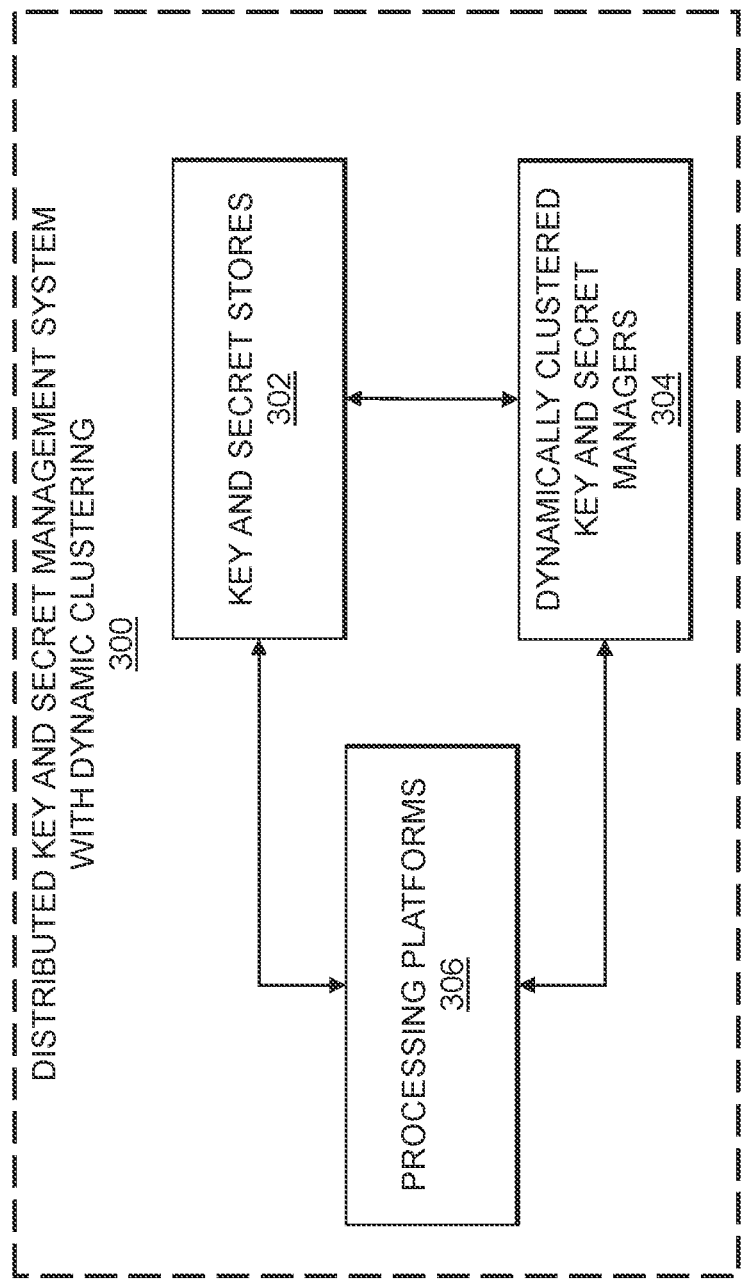
FIG. 3 shows a distributed key and secret management system with dynamic clustering in an illustrative embodiment.

FIG. 3 shows an architecture of a D-KSMS with DC 300, including a set of key and secret stores (KSSs) 302, a set of dynamically clustered key and secret managers (KSMs) 304, and a set of processing platforms 306. The KSSs 302 are configured to store actual keys and secrets. In some embodiments, a given key or secret is stored in multiple copies, and each copy may be split into multiple parts. The KSSs 302 illustratively include multiple KSS instances, with no single KSS containing all the parts of the given key or secret. The dynamically clustered KSMs 304 illustratively include multiple KSM instances organized into one or more KSM clusters. Each of the KSM instances within a given KSM cluster is configured to independently perform key and secret management functions for clients or client clusters on the processing platforms 306 that are associated with the given KSM cluster. The processing platforms 306 illustratively comprise agents installed on assets thereof (e.g., physical and virtual computing resources), with the agents providing an interface to the KSSs 302 and the dynamically clustered KSMs 304 for clients or client clusters of the processing platforms 306.

FIGS. 4A-4E show a detailed view of a D-KSMS with DC 400, which includes KSSs 402, dynamically clustered KSMs 404, and an information technology infrastructure 406. The KSSs 402 include multiple KSS instances denoted KSS 420-1 through 420-7 (collectively referred to as the KSSs 402 or KSS instances 420). Although FIGS. 4A-4E show an embodiment with seven KSS instances 420, it should be appreciated that the particular number of KSS instances 420 may vary (e.g., there may be more or fewer than seven KSS instances).

Figure 4A:
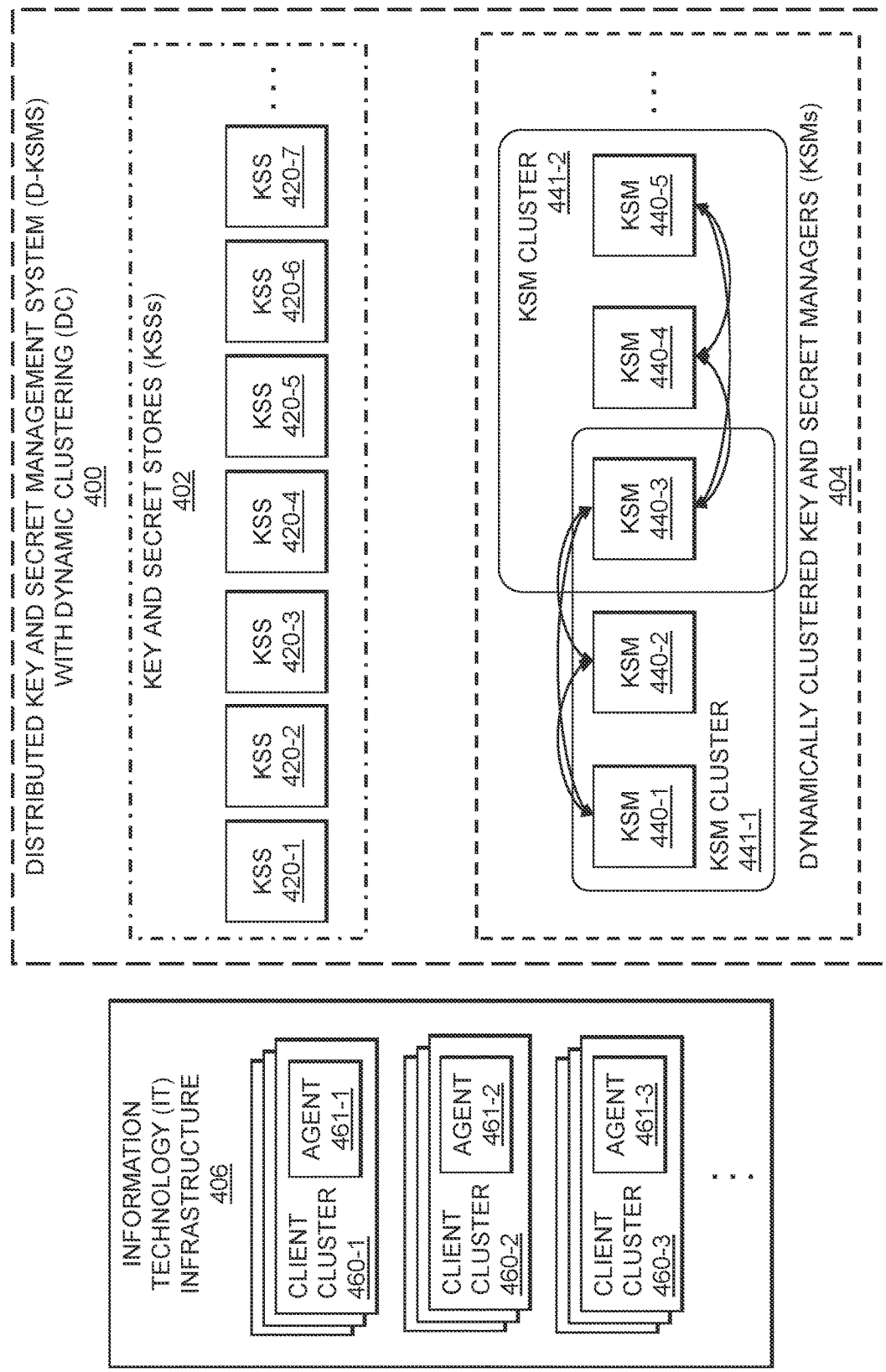
FIGS. 4A-4E show an implementation of a distributed key and secret management system with dynamic clustering in an illustrative embodiment.

The dynamically clustered KSMs 404 include multiple KSM instances denoted KSM 440-1 through 440-5 (collectively referred to as the KSMs 404 or KSM instances 440). In the example of FIGS. 4A-4E, there are two KSM clusters 441-1 and 441-2 (collectively, KSM clusters 441). The KSM cluster 441-1 includes KSM instances 440-1, 440-2 and 440-3, and the KSM cluster 441-2 includes KSM instances 440-3, 440-4 and 440-5. Thus, as illustrated, a particular KSM instance (e.g., KSM 440-3) may be part of multiple KSM clusters. Each of the KSM instances within a KSM cluster is illustratively configured for communication with each other KSM instance in that cluster. This is illustrated in FIG. 4A, which shows connecting lines between the KSM instances 440-1, 440-2 and 440-3 in the KSM cluster 441-1, as well as connecting lines between the KSM instances 440-3, 440-4 and 440-5 in the KSM cluster 441-2. Although FIGS. 4A-4E show an embodiment with five KSM instances 440, it should be appreciated that the particular number of KMS instances 440 may vary (e.g., there may be more or fewer than five KSM instances). Further, there may be different numbers of KSM clusters 441 (e.g., just a single KSM cluster, more than two KSM clusters, etc.). Also, while FIGS. 4A-4E illustrate an example wherein both of the KSM clusters 441-1 and 441-2 include the same number of KSM instances (e.g., three), this is not a requirement. More generally, each KSM cluster may include any desired number of KSM instances, and different KSM clusters may include different numbers of KSM instances. It is further noted that a particular KSM instance may be a member of any desired number of KSM clusters.

The IT infrastructure 406 includes multiple client clusters 460-1, 460-2 and 460-3 (collectively, client clusters 460). Each of the client clusters 460 may include one or more clients. The client clusters 460 may be associated with distributed compute and storage systems across many locations, where each compute or storage system represents a client. Each client or client cluster includes an agent installed thereon providing an interface to that client cluster's KSM clusters and KSSs. Thus, as shown in FIGS. 4A-4E, client cluster 460-1 includes agent 461-1, client cluster 460-2 includes agent 461-2, and client cluster 460-3 includes agent 461-3.

For clarity of illustration, FIGS. 4A-4E are shown and described with respect to each client cluster having a single agent. It should be appreciated, however, that there may be multiple agents for each client cluster. In some embodiments, each client within a client cluster may have its own agent installed thereon. In other embodiments, one agent may be used by at least two clients within a client cluster.

Figure 4B:
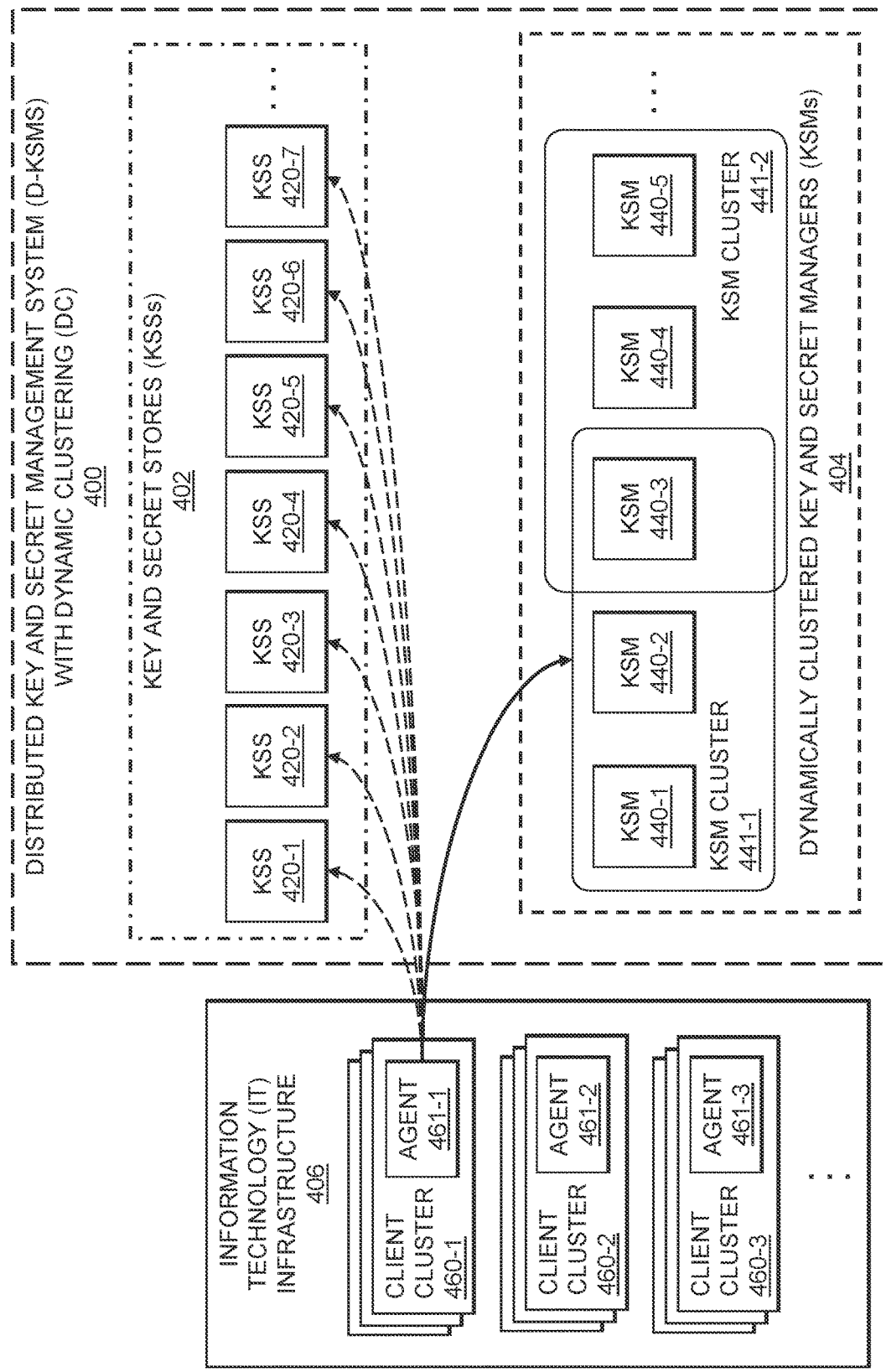

FIG. 4B illustrates the connections of the agent 461-1 of client cluster 460-1. As shown, the agent 461-1 connects to KSM cluster 441-1 (e.g., to one or more KSM instances thereof, as will be described in further detail below) as well as each of the KSS instances 420. Although FIG. 4B illustrates the agent 461-1 connecting to each of the KSS instances 420, this is not a requirement. In some embodiments, the agent 461-1 may connect to only a subset of the KSS instances 420 (e.g., those ones of the KSS instances 420 that store key and secret parts for its associated client cluster 460-1).

Figure 4C:
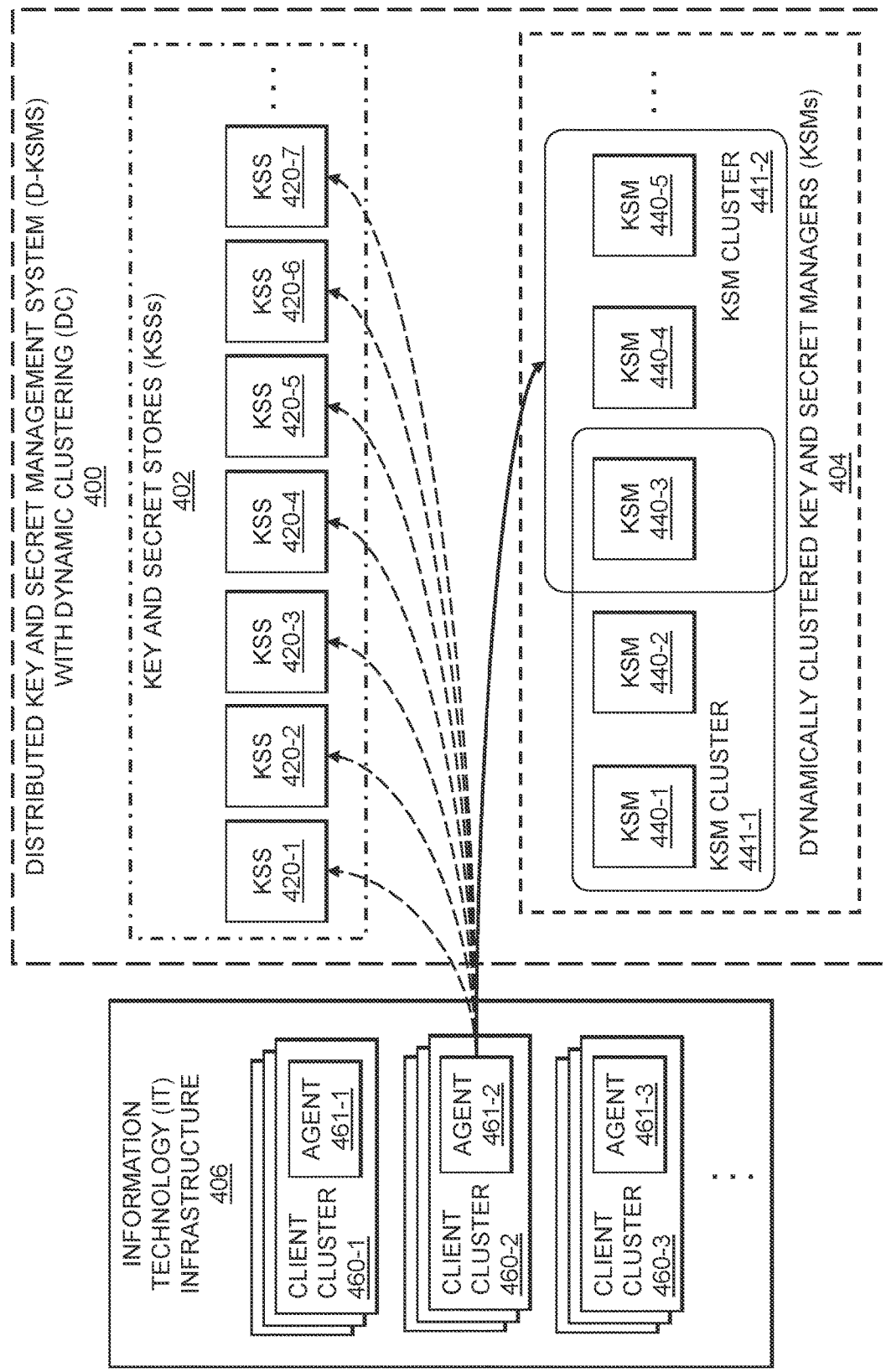

FIG. 4C illustrates the connections of the agent 461-2 of client cluster 460-2. As shown, the agent 461-2 connects to KSM cluster 441-2 (e.g., to one or more KSM instances thereof, as will be described in further detail below) as well as each of the KSS instances 420. Although FIG. 4C illustrates the agent 461-2 connecting to each of the KSS instances 420, this is not a requirement. In some embodiments, the agent 461-2 may connect to only a subset of the KSS instances 420 (e.g., those ones of the KSS instances 420 that store key and secret parts for its associated client cluster 460-2).

Although not explicitly shown in FIGS. 4A-4E, the agent 461-3 of client cluster 460-3 is assumed to connect to a KSM cluster (e.g., which may be one of the KSM clusters 441-1 and 441-2, as there is not necessarily a one-to-one relationship between client clusters and KSM clusters) as well as to at least a subset of the KSS instances 420.

Figure 4D:
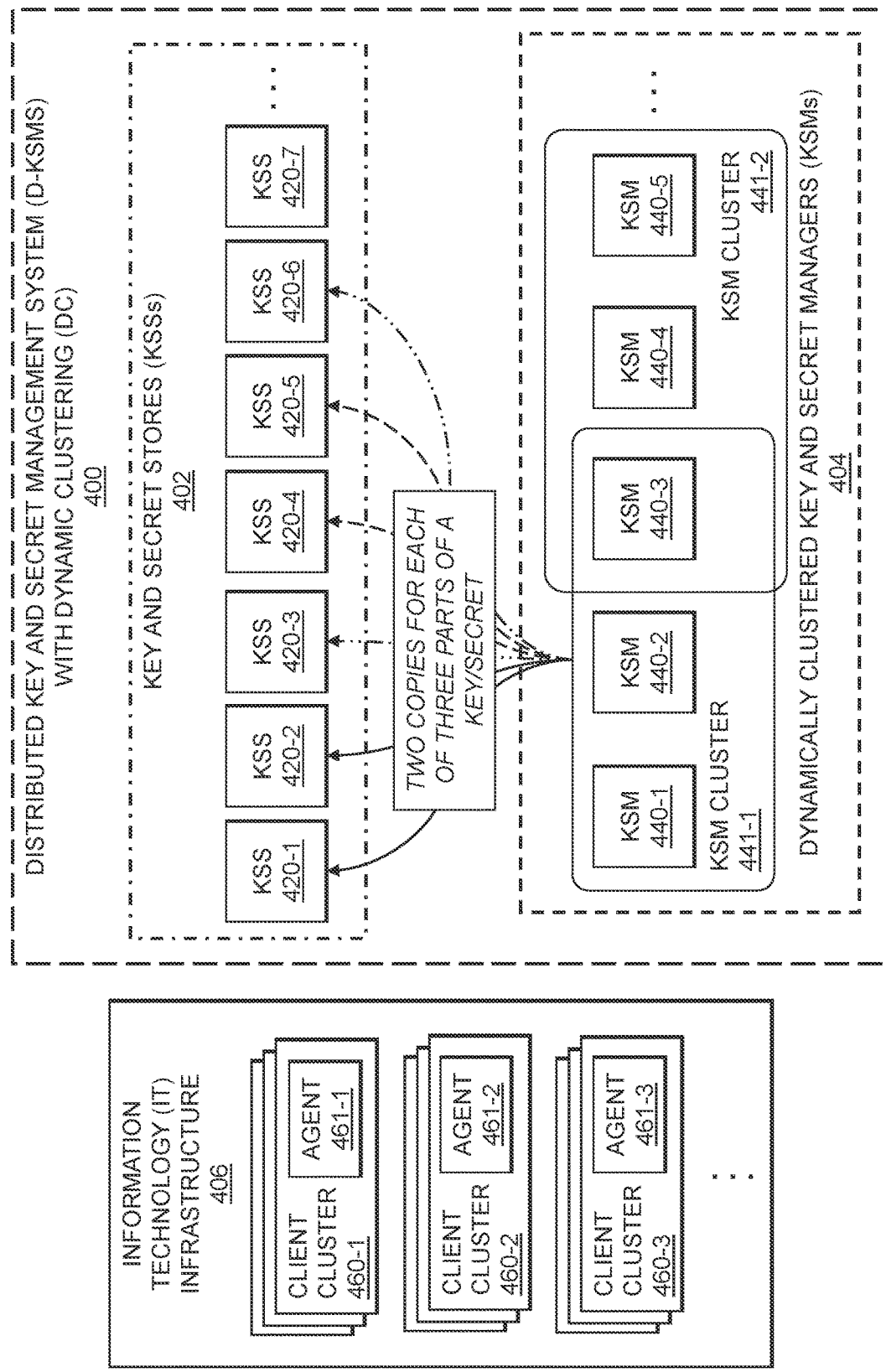
Figure 4E:
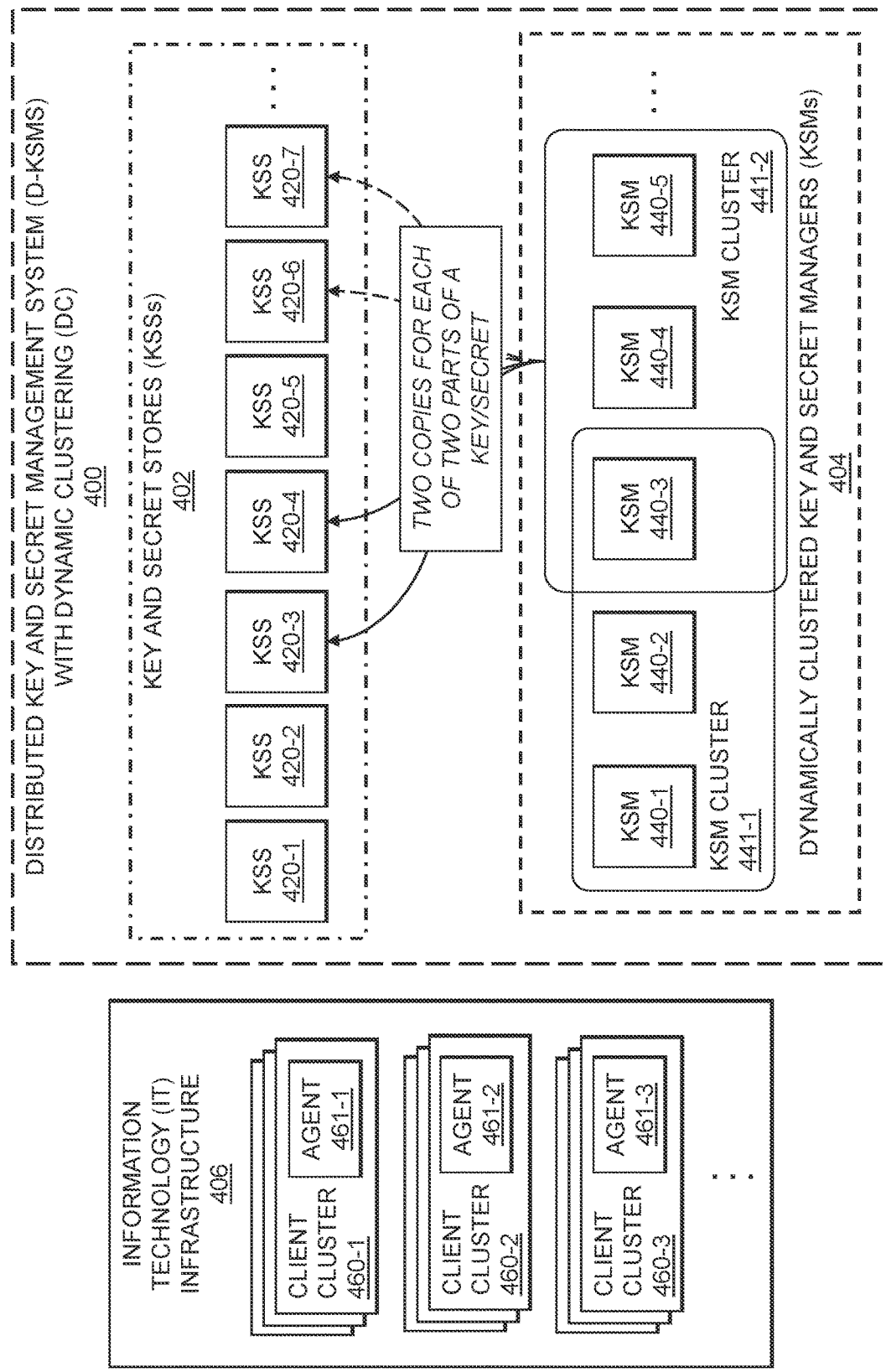

The KSSs 402, as noted above, include the KSS instances 420 which are each configured to store actual keys and secrets. In some embodiments, each of at least a subset of the keys or secrets is stored in multiple copies, and each copy is split into multiple parts where no single one of the KSS instances contains all the parts of a single key or secret. This is illustrated in FIGS. 4D and 4E. FIG. 4D illustrates three parts of a key or secret stored by the KSM cluster 441-1 (e.g., shown with solid, dashed, and dash dot dot lines), with each part of the key or secret having multiple copies on different KSS instances. For example, the first part of the key or secret is stored in KSS 420-1 and KSS 420-2, the second part of the key or secret is stored in KSS 420-3 and 420-6, and the third part of the key or secret is stored in KSS 420-4 and KSS 420-5. FIG. 4E illustrates two parts of a key or secret stored by the KSM cluster 441-2 (e.g., shown with solid and dashed lines), with each part of the key or secret having multiple copies on different KSS instances. For example, the first part of the key or secret is stored in KSS 420-3 and KSS 420-4, and the second part of the key or secret is stored in KSS 420-6 and 420-7.

Each of the KSS instances 420 may be a database or datastore of a compute or storage system (e.g., one of the clients of the client clusters 460 in the IT infrastructure 406), an account in object storage or file storage, a Windows Active Directory (AD), etc.). A KSS instance, in some embodiments, only receives and stores key or secret part material, and none of its metadata. The metadata, as will be described in further detail below, is managed using the KSMs 404. For security, key and secret parts stored in the KSSs 402 in some embodiments do not have any property that identifies them as parts of the same key or secret. In other words, a given key or secret part does not have identifying information for its overall key or secret. The key and secret parts are distributed among the KSSs 402 based on policies defined in the KSMs 404.

Each of the KSM instances 440 is configured to independently perform key and secret management functions, including actions for monitoring, metadata management, distribution, etc. The key and secret management functions of a given KSM instance (e.g., KSM 440-1) may include, but are not limited to: performing discovery and scanning of other KSM instances (e.g., KSM instances 440-2 through 440-5); monitoring connectivity with agents (e.g., agents 461-1 through 461-3) and KSSs 402 (e.g., KSS instances 420-1 through 420-7); assisting the agents (e.g., agents 461-1 through 461-3) with authentication and accessing the KSSs 402 (e.g., KSS instances 420-1 through 420-7); updating the KSM cluster (e.g., KSM clusters 441-1 and 441-2) for each of the agents (e.g., agents 461-1 through 461-3); keeping key and secret part location information for the key and secret parts stored in the KSSs 402 (e.g., KSS instances 420-1 through 420-7); controlling key and secret part replication processes based on replication policies and protection domains; etc. The KSMs 404, in some embodiments, do not receive, keep or send any key or secret part material. One or more of the KSM instances 440-1 through 440-5 may be embedded in one or more of the clients in the IT infrastructure 406. For example, a given KSM instance (e.g., KSM instance 440-1) may be embedded in a compute or storage system that is one of the clients in one of the client clusters 460-1 through 460-3. One or more of the KSM instances 440-1 through 440-5 may alternatively run externally outside all of the clients in the IT infrastructure 406.

The agents 461 are illustratively implemented as software installed on the client clusters 460 (e.g., on compute, storage or other processing platforms providing clients in the IT infrastructure 406). The agents 461 provide interfaces to the KSSs 402 and KSMs 404. Such interfaces will be described below with respect to the agent 461-1 and its associated KSM cluster 441-1 and the KSS instances 420-1 through 420-7, but it should be appreciated that the agents 461-2 and 461-3 provide similar interfaces for their associated KSM clusters 441 and the KSS instances 420. The agent 461-1 provides an interface between the client cluster 460-1, its KSM cluster 441-1, and the KSS instances 420-1 through 420-7. The agent 461-1 can utilize one or more of the KSM instances 440-1, 440-2 and 440-3 in the KSM cluster 441-1 to authenticate against the KSS instances 420-1 through 420-7. The agent 461-1 also splits keys and secrets into parts, and saves key and secret parts in the relevant KSS instances 420-1 through 420-7 based on information provided by one or more of the KSM instances 440-1, 440-2 and 440-3 in the KSM cluster 441-1. The agent 461-1 further requests key and secret parts directly from the relevant KSS instances 420-1 through 420-7 based on information provided by one or more of the KSM instances 440-1, 440-2 and 440-3 in the KSM cluster 441-1. The agent 461-1 re-assembles keys and secrets from the different key and secret parts, and provides the re-assembled keys and secrets to the clients in the client cluster 460-1.

The D-KSMS with DC 400 shown in FIGS. 4A-4E includes different groups of functional relationships. For example, each of the client clusters 460 has or is associated with a dynamic cluster of the KSM instances 440. As described above, client cluster 460-1 has KSM cluster 441-1 including KSM instances 440-1, 440-2 and 440-3, client cluster 460-2 has KSM cluster 441-2 including KSM instances 440-3, 440-4 and 440-5, etc. In this way, each of the client clusters 460 is serviced by multiple ones of the KSM instances 440. The agents 461 in the client clusters 460 can connect to any KSM instance in its associated KSM cluster 441 dynamically according to accessibility. For example, the agent 461-1 in client cluster 460-1 may connect to any of the KSM instances 440-1, 440-2 and 440-3 in the KSM cluster 441-1. In some embodiments, the agent 461-1 may be redirected to a designated one of the KSM instances within the KSM cluster 441-1. Designated KSM instances will be described in further detail below. It should be noted that one or more of the KSM instances 440 may be located inside or embedded on clients in the IT infrastructure 406. For example, one of the KSM instances 440 (e.g., KSM instance 440-1) may be located or embedded inside a given one of the clients in the IT infrastructure 406, and thus that KSM instance may be a "local" KSM for the given client.

In the D-KSMS with DC 400 shown in FIGS. 4A-4E, there is a set of the KSS instances 420 for each of the KSM clusters 441, and for each of the client clusters 460. The KSM instances in a given KSM cluster discover the appropriate number of KSS instances required to store key and secret parts and copies for a given client cluster, and such KSS instances form a set for the given client cluster. The metadata of KSS instance connectivity, as well as key and secret copy and part information, is stored and managed by every KSM instance in a KSM cluster. Each client's agent in a client cluster can access such metadata at any time. Further, each client's agent in a client cluster can directly access all of the KSS instances in its associated KSS instance set to obtain key and secret parts. Consider, as an example, the client cluster 460-1 which has an agent 461-1 associated with KSM cluster 441-1. The KSM cluster 441-1, as illustrated in FIG. 4D, may store two copies of each of three parts of a key or secret on KSS instances 420-1 through 420-6. This key or secret may be stored on behalf of the client cluster 460-1, and thus the client cluster 460-1 may be associated with the KSM cluster 441-1 and a KSS set including KSS instances 420-1 through 420-6. Consider, as another example, the client cluster 460-2 which has an agent 461-2 associated with KSM cluster 441-2. The KSM cluster 441-2, as illustrated in FIG. 4E, may store two copies of each of two parts of a key or secret on KSS instances 420-3, 420-4, 420-6 and 420-7. This key or secret may be stored on behalf of the client cluster 460-2, and thus the client cluster 460-2 may be associated with the KSM cluster 441-2 and a KSS set including KSS instances 420-3, 420-4, 420-6 and 420-7.

Figure 5:
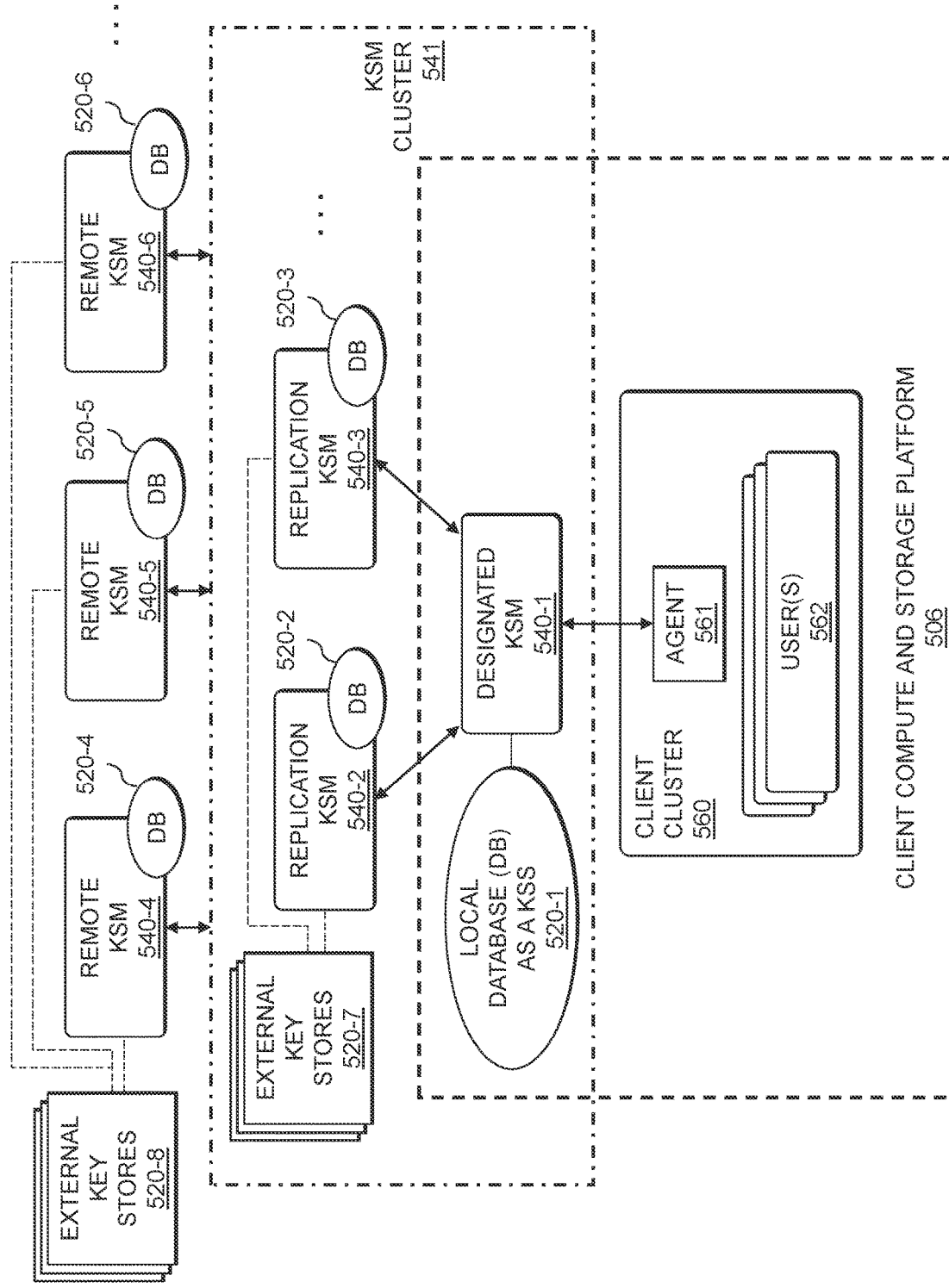
FIG. 5 shows a dynamic cluster of key and secret management instances for a client cluster in an illustrative embodiment.

FIG. 5 illustrates a client compute and storage platform 506 including a client or client cluster 560 and an associated agent 561. The client cluster 560 is assumed to be used by or associated with a set of users 562, where the users 562 request storage and retrieval of keys and secrets. The client cluster 560 is associated with a dynamic KSM cluster 541. The KSM cluster 541 includes one "designated" KSM 540-1 as well as a set of "replication" KSMs 540-2 and 540-3. Although FIG. 5 shows an example where the KSM cluster includes two replication KSMs, this is not a requirement. More generally, a KSM cluster includes at least one replication KSM, and may include more than two replication KSMs as desired.

The designated KSM 540-1 may be a KSM instance that is embedded on the client compute and storage platform 506 as illustrated in FIG. 5. In some embodiments, an embedded KSM is the first choice for the "designated" KSM for a particular client or client cluster. If an embedded KSM does not exist for a particular client or client cluster, the designated KSM may be chosen at the time of registration of the agent for that client or client cluster. The agent 561 registers with the initial designated KSM 540-1. The designated KSM 540-1 discovers "remote" KSMs and establishes replication relationships with at least one remote KSM at any run time. Such discovered remote KSMs, following establishment of the replication relationship, become replication KSMs for the KSM cluster 541. In the FIG. 5 example, there are two replication KSMs 540-2 and 540-3. FIG. 5 further shows three additional remote KSMs 540-4, 540-5 and 540-6. It should be appreciated, however, that there may be any number of remote KSMs (e.g., there may be more or fewer than three remote KSMs relative to any given KSM cluster).

The remote KSMs 540-4, 540-5 and 540-6 may become replication KSMs in the KSM cluster 541 as needed, or based on one or more selection criteria or policies. In some embodiments, the criteria for selecting replication KSMs include: determining whether the designated KSM trusts a given remote KSM; determining whether the given remote KSM has specified capabilities; determining whether the given remote KSM is reachable on a given network; determining whether the network distance between the designated KSM and the given remote KSM is below a specified threshold (e.g., to promote selection of remote KSMs with as short as possible network distance from the designated KSM); determining whether usage of the given remote KSM is measurable and billable; determining whether the given remote KSM has mutual recovery as an asset.

In some embodiments, the KSM cluster 541 has an "active-active" configuration, meaning that the designated KSM 540-1 and each of the replication KSMs 540-2 and 540-3 in the KSM cluster 541 can perform key and secret management operations for the client cluster 560. Thus, any one of the users 562 or an administrator of the client cluster 560 can login to any of the KSMs in the KSM cluster 541 and perform full management functions.

In the FIG. 5 example, the designated KSM 540-1 may be associated with a local database (DB) 520-1 acting as a KSS. Similarly, other ones of the KSMs (e.g., replication KSMs 540-2 and 540-3, remote KSMs 540-4, 540-5 and 540-6) are associated with local DBs (e.g., 520-2 through 520-6) acting as KSSs. The designated KSM 540-1 and replication KSMs 540-2 and 540-3 may also be configured for communication with a set of external KSSs 520-7. The remote KSMs 540-5 through 540-6 may be configured for communication with a set of external KSSs 520-8. A given KSS instance may be part of one or both of the external KSSs 520-7 and 520-8. Further, a local DB may act as a KSS for a given one of the KSMs, and be an external KSS for other ones of the KSMs.

The designated KSM 540-1 may have various properties or features. For example, the agent 561 of the client cluster 560 may always or only send requests to its designated KSM 540-1, assuming that the designated KSM 540-1 is online or available. If the current designated KSM 540-1 for the client cluster 560 is down or unavailable (e.g., experiencing degraded network connectivity or performance), one of the replication KSMs 540-2 and 540-3 in the KSM cluster 541 may be "upgraded" to be or act as the new designated KSM. The choice of which replication KSM should be selected to be or act as the new designated KSM may be based on geographic proximity (e.g., selecting the replication KSM which is geographically closest to the client cluster 560), network connectivity (e.g., bandwidth, latency, speed, stability, etc.), etc. When the current designated KSM 540-1 is down or unavailable, the client cluster 560 (via its agent 561) may send a message to replication KSMs in the KSM cluster 541 indicating the need for a new designated KSM. The message may be sent to all of the replication KSMs in the KSM cluster 541, to a subset of the replication KSMs in the KSM cluster 541 (e.g., to some designated number of replication KSMs), to replication KSMs in the KSM cluster 541 in some designated order (e.g., in accordance with an ordered list), etc.

Replication KSMs that receive the message may respond, indicating whether they accept and can be a designated KSM. When multiple replication KSMs respond to the message indicating that they are capable and accept the request to become the new designated KSM, the agent 561 may use various selection criteria for choosing which of such multiple replication KSMs become the new designated KSM for the KSM cluster 541. Such selection criteria may include geographic proximity, network connectivity, etc. In some embodiments, the agent 561 may accept and upgrade the first replication KSM that responds to be the new designated KSM. Once a new designated KSM is established, a new KSM may be added to the KSM cluster 541 (e.g., one or more of the remote KSMs 540-4 through 540-6 may become replication KSMs for the KSM cluster 541). The list of KSMs for the KSM cluster 541 may then be updated in all agents for clients or client clusters that utilize the KSM cluster 541.

To form KSM clusters, each client or client cluster may choose a designated KSM. The designated KSMs then discover one or more remote or neighbor KSMs to be included as replication KSMs for respective KSM clusters. The designated KSMs may set requirements for their cluster members, and such requirements may be evaluated by discovered member candidate KSMs. If a candidate KSM does not meet the requirements set by the designated KSM for a given KSM cluster, that candidate KSM may be rejected. In some embodiments, the designated KSM of a given KSM cluster requires all replication KSMs to have connectivity with all KSS instances used by the given KSM cluster. The designated KSM of the given KSM cluster may also or alternatively require that replication KSMs have some designated minimum storage capacity (e.g., which may be important for enabling KSM membership in multiple KSM clusters). The designated KSM may further or alternatively require exclusive KSM membership (e.g., that replication KSMs belong to only the given KSM cluster). Communications between the designated KSM and the replication KSMs of a given KSM cluster may include: keep-alive, handshake or heartbeat messages; mutual trust establishment; metadata replication; etc.

Figure 6:
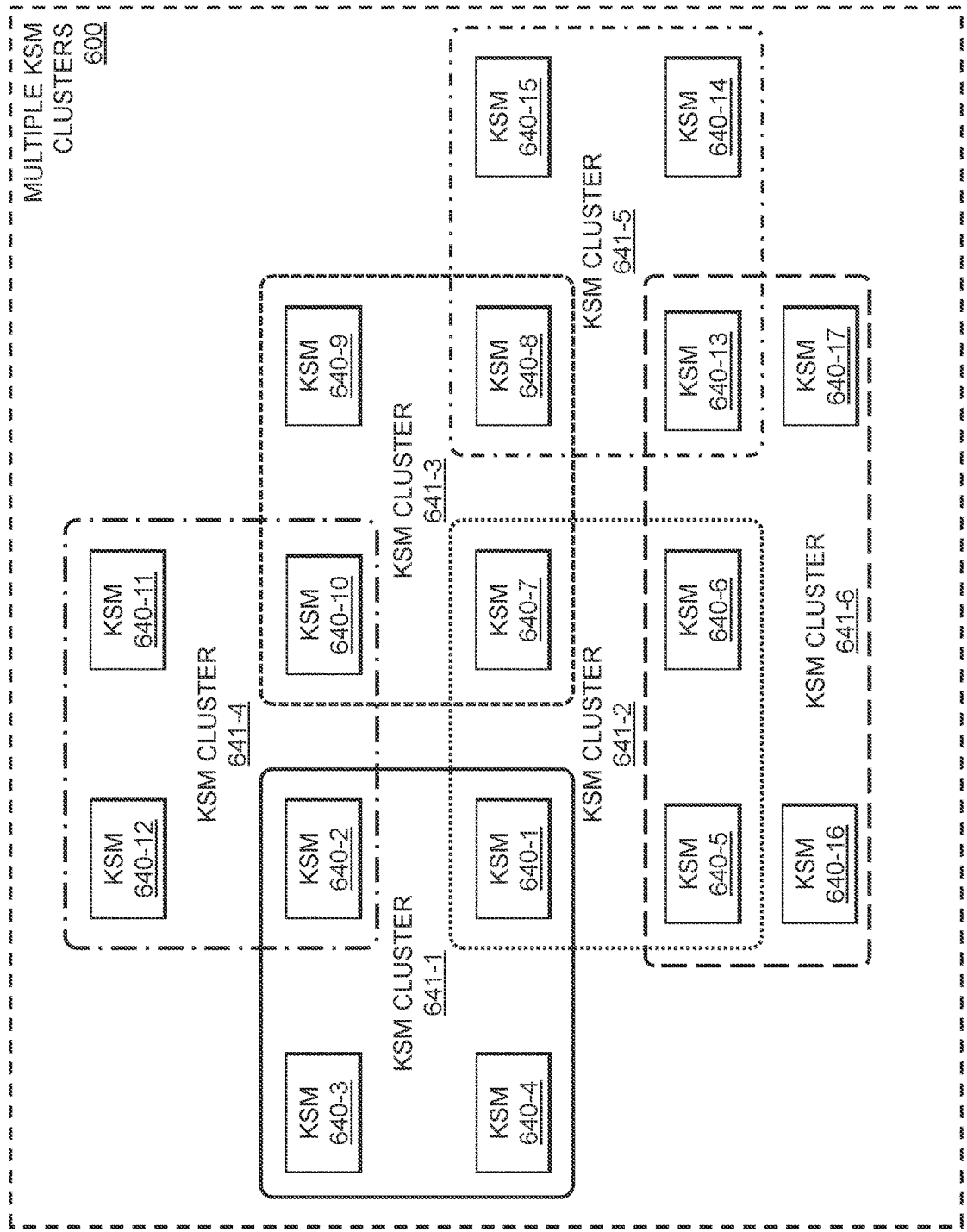
FIG. 6 shows a topology of key and secret management instance clusters in a distributed key and secret management system with dynamic clustering in an illustrative embodiment.

FIG. 6 illustrates a topology of multiple KSM clusters 600, including KSM clusters 641-1 through 641-6 (collectively, KSM clusters 641) associated with respective processing platforms (e.g., clients or client clusters). The KSM cluster 641-1 includes KSMs 640-1, 640-2, 640-3 and 640-4. The KSM 640-1 is assumed to be the designated KSM in the KSM cluster 641-1, with KSMs 640-2, 640-3 and 640-4 being replication KSMs for the KSM cluster 641-1. The KSM cluster 641-2 includes KSMs 640-1, 640-5, 640-6 and 640-7. The KSM 640-6 is assumed to be the designated KSM in the KSM cluster 641-2, with KSMs 640-1, 640-5 and 640-7 being replication KSMs for the KSM cluster 641-2. The KSM cluster 641-3 includes KSMs 640-7, 640-8, 640-9 and 640-10. The KSM 640-8 is assumed to be the designated KSM in the KSM cluster 641-3, with KSMs 640-7, 640-9 and 640-10 being replication KSMs for the KSM cluster 641-3. The KSM cluster 641-4 includes KSMs 640-2, 640-10, 640-11 and 640-12. The KSM 640-10 is assumed to be the designated KSM in the KSM cluster 641-4, with KSMs 640-2, 640-11 and 640-12 being replication KSMs for the KSM cluster 641-4. The KSM cluster 641-5 includes KSMs 640-8, 640-13, 640-14 and 640-15. The KSM 640-14 is assumed to be the designated KSM in the KSM cluster 641-5, with KSMs 640-8, 640-13 and 640-15 being replication KSMs for the KSM cluster 641-5. The KSM cluster 641-6 includes KSMs 640-5, 640-6, 640-13, 640-16 and 640-17. The KSM 640-17 is assumed to be the designated KSM in the KSM cluster 641-6, with KSMs 640-5, 640-6, 640-13 and 640-16 being replication KSMs for the KSM cluster 641-6.

As illustrated in FIG. 6, KSMs may have different roles in different ones of the KSM clusters 641. For example, KSM 640-1 is the designated KSM for KSM cluster 641-1, but is a replication KSM for KSM cluster 641-2. The KSM 640-1 may also be a replication KSM for one or more additional KSM clusters not shown in FIG. 6. The KSM 640-1 may thus have multiple databases, a first designated database for KSM cluster 641-1, a second replicated database for KSM cluster 641-2, and possibly one or more additional databases for other KSM clusters not shown in FIG. 6 that the KSM 640-1 is a replication KSM for. As further illustrated in FIG. 6, different ones of the KSM clusters 641 may include different numbers of KSMs. For example, the KSM clusters 641-1 through 641-5 each include four KSMs, while KSM cluster 641-6 includes five KSMs. Various other examples are possible, and each KSM cluster 641 may include any desired number of KSMs (e.g., a designated KSM and one or more replication KSMs).

Figure 7:
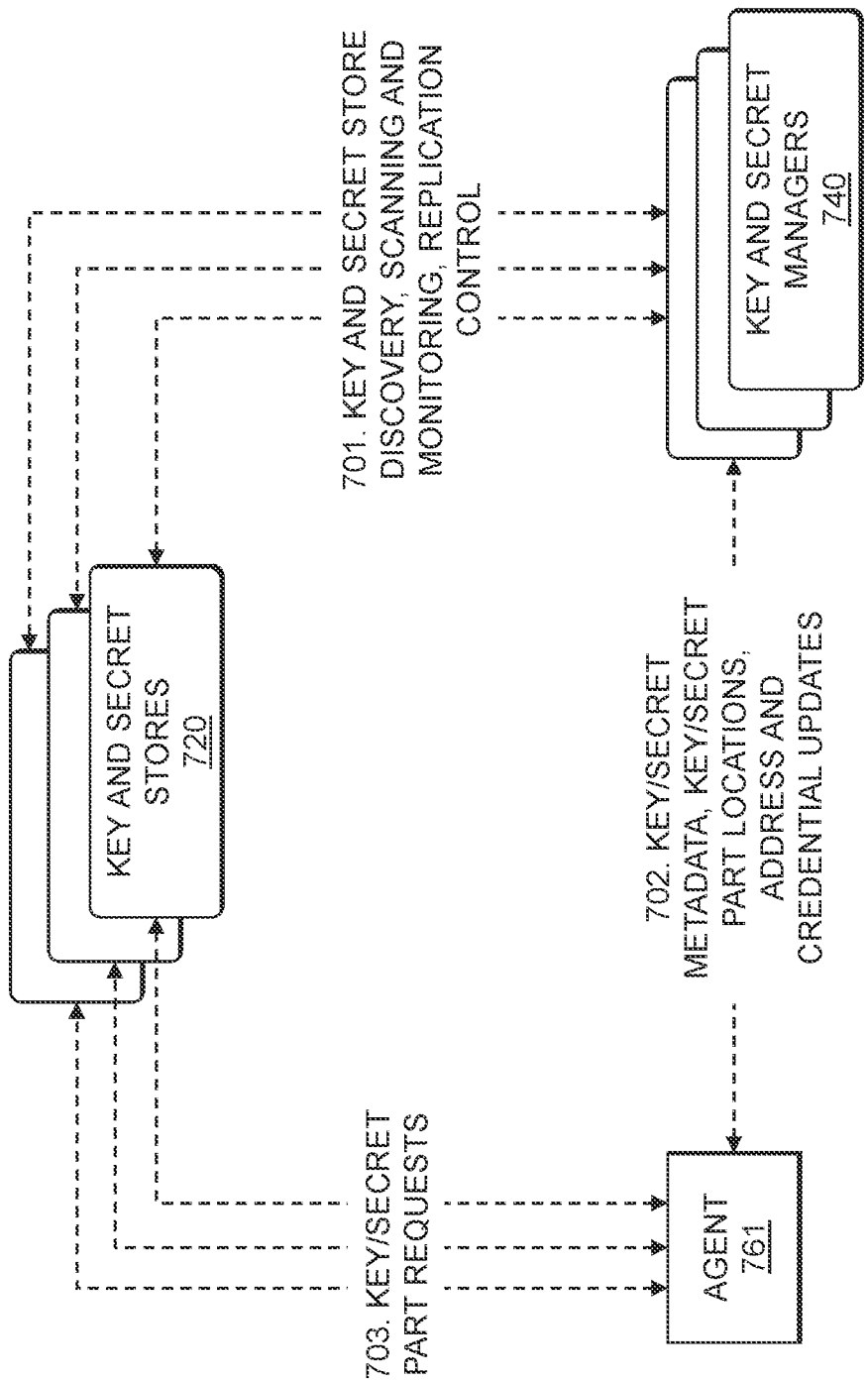
FIG. 7 shows key and secret split and store operations in a distributed key and secret management system with dynamic clustering in an illustrative embodiment.

FIG. 7 illustrates key and secret split and store operations using KSSs 720, KSMs 740 and an agent 761. In FIG. 7, the KSMs 740 are assumed to provide a KSM cluster for a client or client cluster associated with the agent 761. The KSSs 720 store key and secret parts for the client or client cluster that utilizes agent 761. The KSSs 720 save client keys and secrets persistently, with each key or secret illustratively being saved in multiple copies with each copy split into multiple parts. For a given key or secret, every part of each copy is saved in a different one of the KSSs 720. Thus, each of the KSSs 720 contains only one part of one copy for any given key or secret.

Data transmission between the agent 761, KSMs 740 and KSSs 720 will now be described, where the agent 761 is assumed to be co-located with a given client or client cluster and provides interfaces for key operations for the given client or client cluster. In step 701, the KSMs 740 perform discovery of the KSSs 720, including scanning and monitoring of the discovered KSSs 720 and performing replication control for key and secret data on such discovered KSSs 720. In step 702, the agent 761 communicates with the KSMs 740 to manage key and secret metadata, obtain information regarding key and secret part locations on the KSSs 720, perform address and credential updates, etc. The agent 761 communicates key and secret part requests directly to the KSSs 720 in step 703, using information obtained from the KSMs 740 in step 702.

Key and secret operations include saving keys and secrets, and getting or retrieving keys and secrets. Upon receiving a client request to store a new key or secret, the agent 761 sends the client key or secret identifier (ID), size and attributes to the KSMs 740, which decide whether the key or secret should be split and, if so, which of the KSSs 720 to split the new key or secret among. The KSMs 740 then generate a KSS list and key part IDs (e.g., identifying which of the KSSs 720 should be used to store which parts of the new key or secret). This information (e.g., the key or secret ID, the KSS list, the key or secret part IDs, etc.) is saved by the KSMs 740, and is also returned to the agent 761, which utilizes the information to split the new key or secret into multiple parts, and store the multiple parts under the provided part IDs in the relevant KSSs 720. It should be noted that the KSMs 740 do not actually need to receive key or secret content, only the key or secret ID, size and attributes.

Upon receiving a client request to get a key or secret (e.g., specified by a key or secret ID), the agent 761 sends the client key or secret ID to the KSMs 740. The KSMs 740 compile a list of the KSSs 720 containing all the parts of the key or secret identified by the received key or secret ID, and sends this information along with key or secret part IDs and attributes back to the agent 761. The agent 761 will then request each key or secret part from a relevant one of the KSSs 720 by their associated key or secret part IDs, and combine such key or secret parts into the key or secret which is provided back to the client that initiated the get key or secret request.

Key and secret data replication will now be described. The KSMs 740 may continuously monitor the availability of the KSSs 720, and according to designated key or secret split and replication policies may initiate key or secret part relocation or replication. To do this, the KSMs 740 may employ connected agents (e.g., such as agent 761) to which the KSMs 740 send jobs containing KSSs 720 and key or secret part ID lists. As in all key and secret operations, key or secret data only needs to be transferred between the agent 761 and the KSSs 720 (e.g., the KSMs 740 do not have or need access to key or secret content). The jobs sent from the KSMs 740 to the agent 761 may be processed by the agent 761 asynchronously. Upon completion, including partial success or completion, the agent 761 reports such status to the KSMs 740 which updates associated key or secret location information databases.

Key or secret split policies may include various types of user-defined policies, including: enabling and disabling split operations; splitting depending or based on key or secret size; splitting based on KSS availability (e.g., limiting key or secret part numbers to the number of KSSs available to the agent); etc. Key or secret replication policies may include various types of user-defined policies, including: KSS availability zone based replication (e.g., replicas are stored in different zones); KSS geographic location based replication (e.g., replicas are stored in the same or different geographic locations); current agent location based replication (e.g., replicas are stored such that active agents have quick and reliable access to the replicas); replication scale (e.g., creating a fixed number of replicas, or scale according to the number of active agents and available zones); key or secret parts number (e.g., scale replication according to the number of key or secret parts and their location to avoid co-location of more than one part of a key or secret in the same KSS); etc.

Figure 8A:
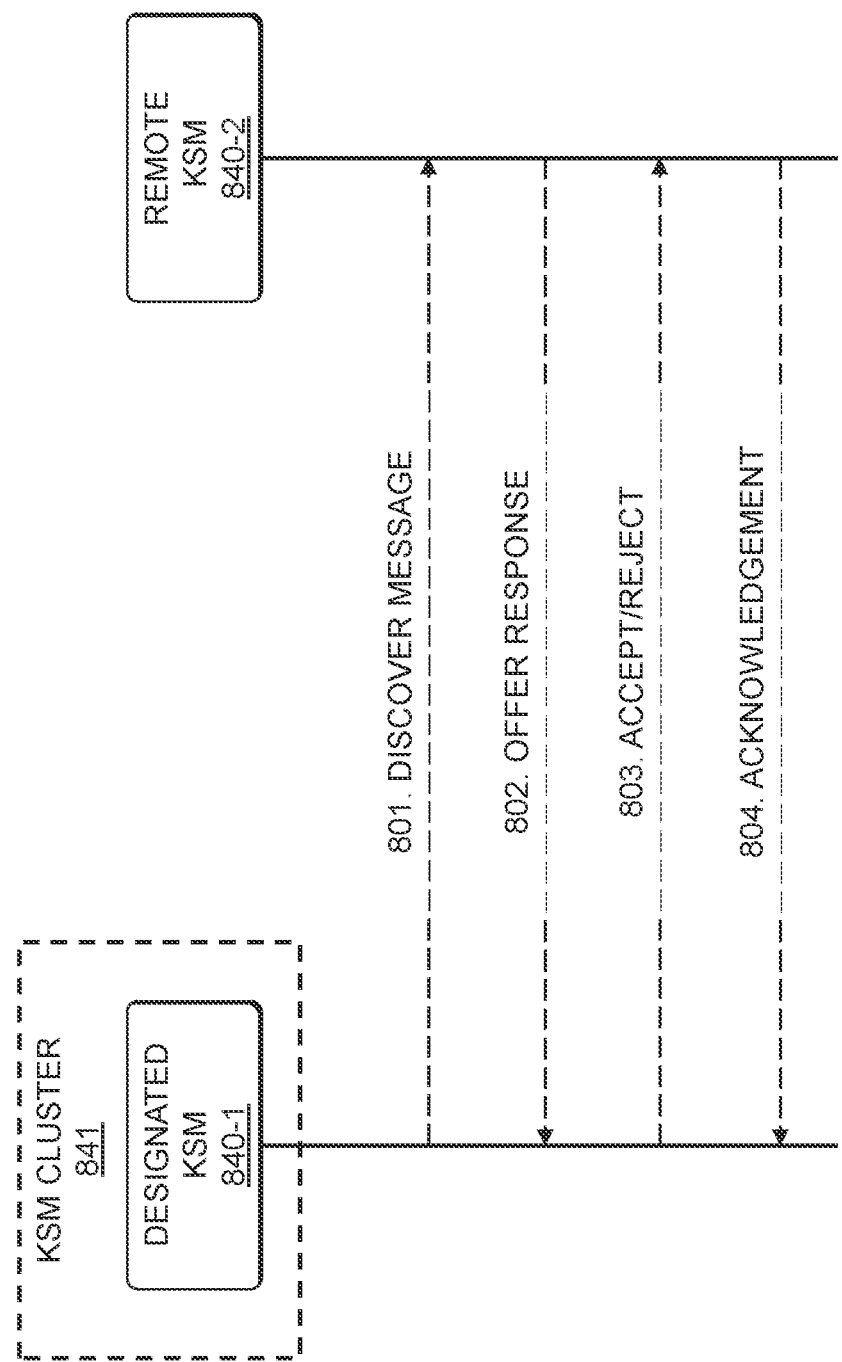
FIGS. 8A and 8B show process flows for key and secret management instance cluster discovery and metadata replication in an illustrative embodiment.
Figure 8B:
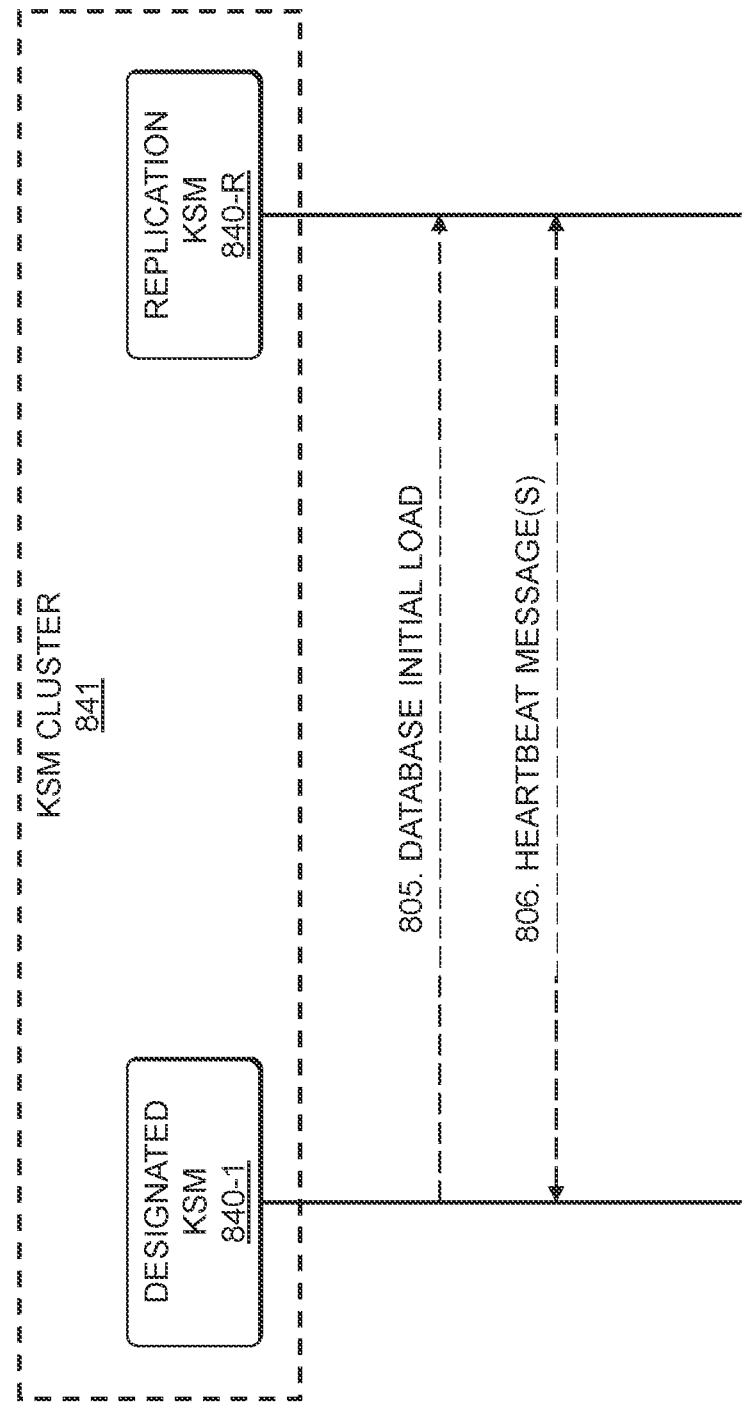

FIGS. 8A and 8B illustrate process flows for KSM discovery and metadata replication. More particularly, FIGS. 8A and 8B show a KSM cluster 841 and its designated KSM 840-1. The designated KSM 840-1 and KSM cluster 841 may be associated with a client or client cluster running on a processing platform (e.g., local compute and storage systems, HCI, cloud, etc.). FIG. 8A illustrates KSM cluster 841 member discovery with a remote KSM 840-2, and FIG. 8B illustrates metadata replication for a replication KSM 840-R (e.g., which may be remote KSM 840-2, if accepted as a member of the KSM cluster 841 for the local platform following the FIG. 8A process flow).

KSM cluster 841 member discovery includes a discovery method, which may be based on a cost matrix for candidate or potential new KSM cluster members (e.g., such as remote KSM 840-2). The cost matrix may consider various factors, such as distance, bandwidth, remote resources, etc. Potential new KSM cluster members (e.g., remote KSMs such as remote KSM 840-2) have servers configured to listen on one or more specified ports for discover messages broadcast by other KSMs. In step 801, the designated KSM 840-1 broadcasts such a discover message to the one or more specified ports. The discover message sent in step 801 may be referred to as a "hello" message, which includes various information such as an IP address, platform, configuration, etc. for the designated KSM 840-1. The remote KSM 840-2 in step 802 returns an offer response, which similarly includes information such as an IP address, platform, configuration, etc. for the remote KSM 840-2.

The designated KSM 840-1 uses the information in the step 802 offer response to determine whether to accept or reject the remote KSM 840-2 as a member of the KSM cluster 841. The designated KSM 840-1 then sends to the remote KSM 840-2 an accept or reject response in step 803. The step 803 response may be an accept response to accept the remote KSM 840-2 as a new replication KSM in the KSM cluster 841, or a reject response to reject the remote KMS 840-2 as a new replication KSM in the KSM cluster 841. If the response in step 803 is an accept response, the designated KSM 840-1 sets up a connection to the remote KSM 840-2 and performs a database initial load. If the response in step 803 is a reject response, the designated KSM 840-2 will wait on other remote KSMs (not shown in FIG. 8A). The remote KSM 840-2 in step 804 provides an acknowledgement response to the designated KSM 840-1.

FIG. 8B, as noted above, shows the process flow for metadata replication to a replication KSM 840-R. The replication KSM 840-R may be the remote KSM 840-2, if the response in step 803 is an accept response. In step 805, the designated KSM 840-1 performs a database initial load for the replication KSM 840-R (e.g., to load information on a set of KSSs used to store keys or secrets for a client or client cluster that access the KSM cluster 841, including information regarding key or secret splits, copy and part location information, etc.). In step 806, heartbeat or keep alive messages are exchanged between the designated KSM 840-1 and the replication KSM 840-R. Step 806 may be performed periodically between all the KSMs in the KSM cluster 841 (e.g., so as to detect when KSMs become available, and potentially when a new KSM should be promoted or upgraded to be the designated KSM if the current designated KSM is offline or unavailable).

Figure 9:
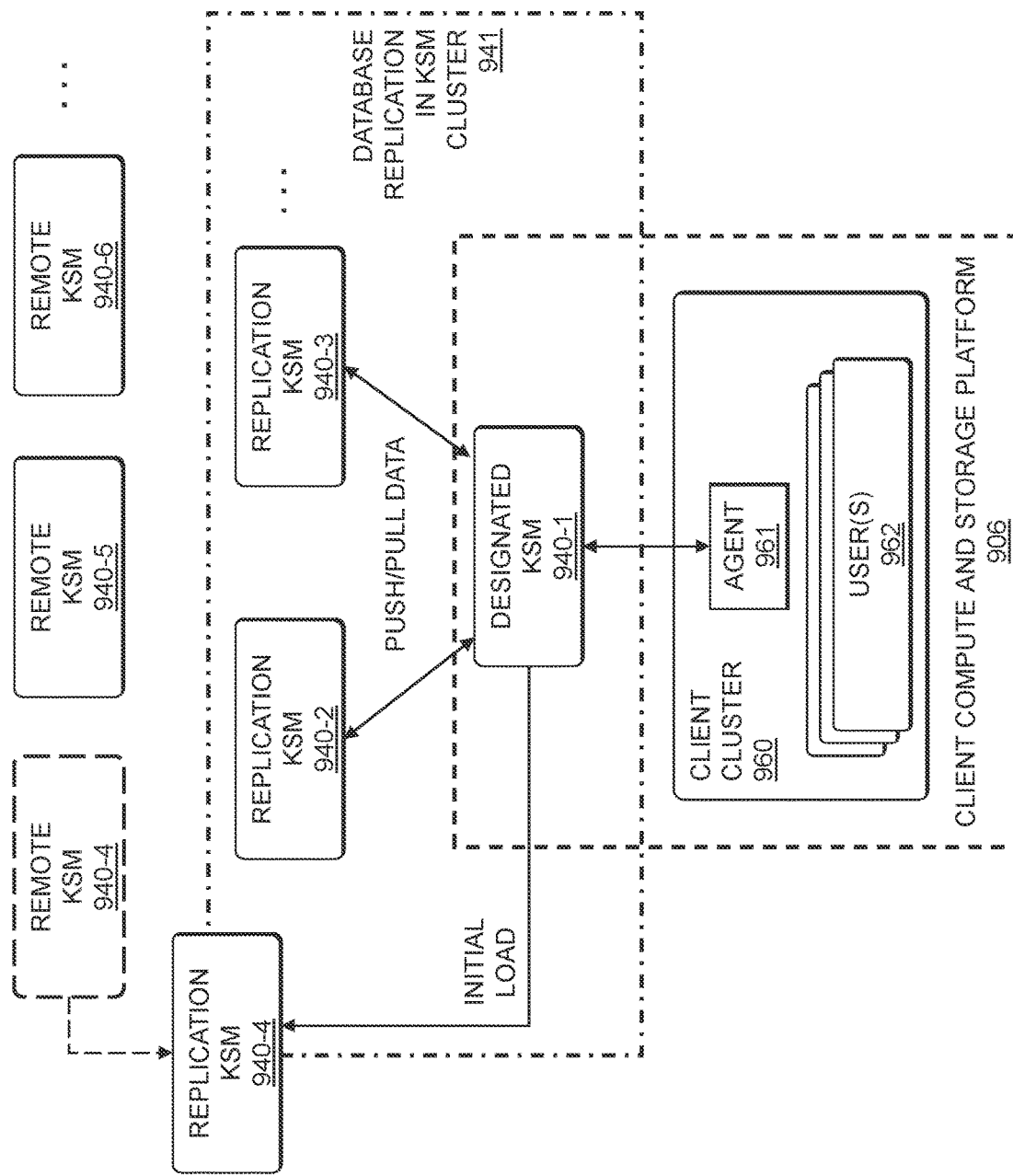
FIG. 9 shows replication of metadata among key and secret management instances in a key and secret management instance cluster of a distributed key and secret management system with dynamic clustering in an illustrative embodiment.

Metadata replication in a KSM cluster 941 will now be described with respect to FIG. 9. FIG. 9 shows a client compute and storage platform 906 (e.g., an example of a client processing platform) that includes a client cluster 960 with a set of users 962 that utilize an agent 961 for communication with the KSM cluster 941. More particularly, the agent 961 is shown in FIG. 9 as communicating with the designated KSM 940-1 of the KSM cluster 941, where the designated KSM 940-1 is embedded locally on the client compute and storage platform 906. It should be appreciated, however, that the designated KSM 940-1 may alternatively be located external to the client compute and storage platform 906. While the agent 961 is shown in FIG. 9 connecting only to the designated KSM 940-1 of the KSM cluster 941 for clarity of illustration, it should be appreciated that the agent 961 may also or alternatively connect to any of the replication KSMs (e.g., replication KSMs 940-2 and 940-3) of the KSM cluster 941 (e.g., such as at times when the designated KSM 940-1 is offline or unavailable, for load balancing across the KSMs in the KSM cluster 941, etc.). FIG. 9 further shows a set of remote KSMs 940-4 through 940-6.

Member authentication may be performed across the KSMs of the KSM cluster 941. In the dynamic KSM cluster 941, user 962 credentials may be shared. Users 962 may login as cluster users to request tokens. User 962 credentials may be replicated in databases associated with each of the KSMs of the KSM cluster 941. For example, user 962 credentials may be replicated in the database of a remote KSM 940-4 during an initial load when the remote KSM 940-4 is joining the KSM cluster 941 as a new member. This is illustrated in FIG. 9, where the remote KSM 940-4 becomes a replication KSM 940-4 in the KSM cluster 941 (e.g., such as using the process flows of FIGS. 8A and 8B described above).

Database replication across the KSMs in the KSM cluster 941 may be based on various policies, including one or more data replication policies. The database for a given one of the KSMs in the KSM cluster 941, such as the designated KSM 940-1, may maintain tables for data changes (e.g., using Structured Query Language (SQL) insertion, update and deletion operations). Database changes may be packaged into batches. Each batch may include some designated threshold number of changes, a designated size of changes, all changes within some designated time period, combinations thereof, etc.

In some embodiments, combinations of synchronous and asynchronous replication may be performed for database replication. For synchronous replication, the designated KSM 940-1 (or any other KSM in the KSM cluster 941 that has a batch of database changes to propagate to other KSMs in the KSM cluster 941) will connect to other online KSMs in the KSM cluster 941 and send the batches of database changes over a secure connection (e.g., a Transport Layer Security (TLS) connection). Batches of database changes are marked as sent (e.g., when the receiving KSMs acknowledge receipt). Asynchronous replication may be performed for KSMs in the KSM cluster 941 that are offline during the synchronous replication. Batches of database changes sent while a given KSM in the KSM cluster 941 is offline may be marked as "unsent" for the given KSM. When the given KSM comes back online and connects again, it will search for unsent batches of database changes. If there are any unsent batches of database changes, they may then be sent to the given KSM over an TLS or other secure connection.

Data is illustratively replicated across all of the KSMs in the KSM cluster 941. The designated KSM 940-1, for example, may push data to the replication KSMs 940-2 through 940-4 periodically, on demand, combinations thereof, etc. The replication KSMs 940-2 through 940-4 may also or alternatively pull data from the designated KSM 940-1. While described with respect to data being pushed or pulled from the designated KSM 940-1 to the replication KSMs 940-2 through 940-4, it should be appreciated that in some cases KSMs other than the designated KSM 940-1 may push or pull data to other KSMs in the cluster.

A D-KSMS with DC may be deployed in various processing platforms, including compute and storage systems, corporate or other IT infrastructure, multi-cloud environments, etc. Example use cases for which a D-KSMS with DC may be deployed include, but are not limited to, clustered storage systems, distributed HCI, key or secret management for banks or other financial institutions, etc.

Figure 10A:
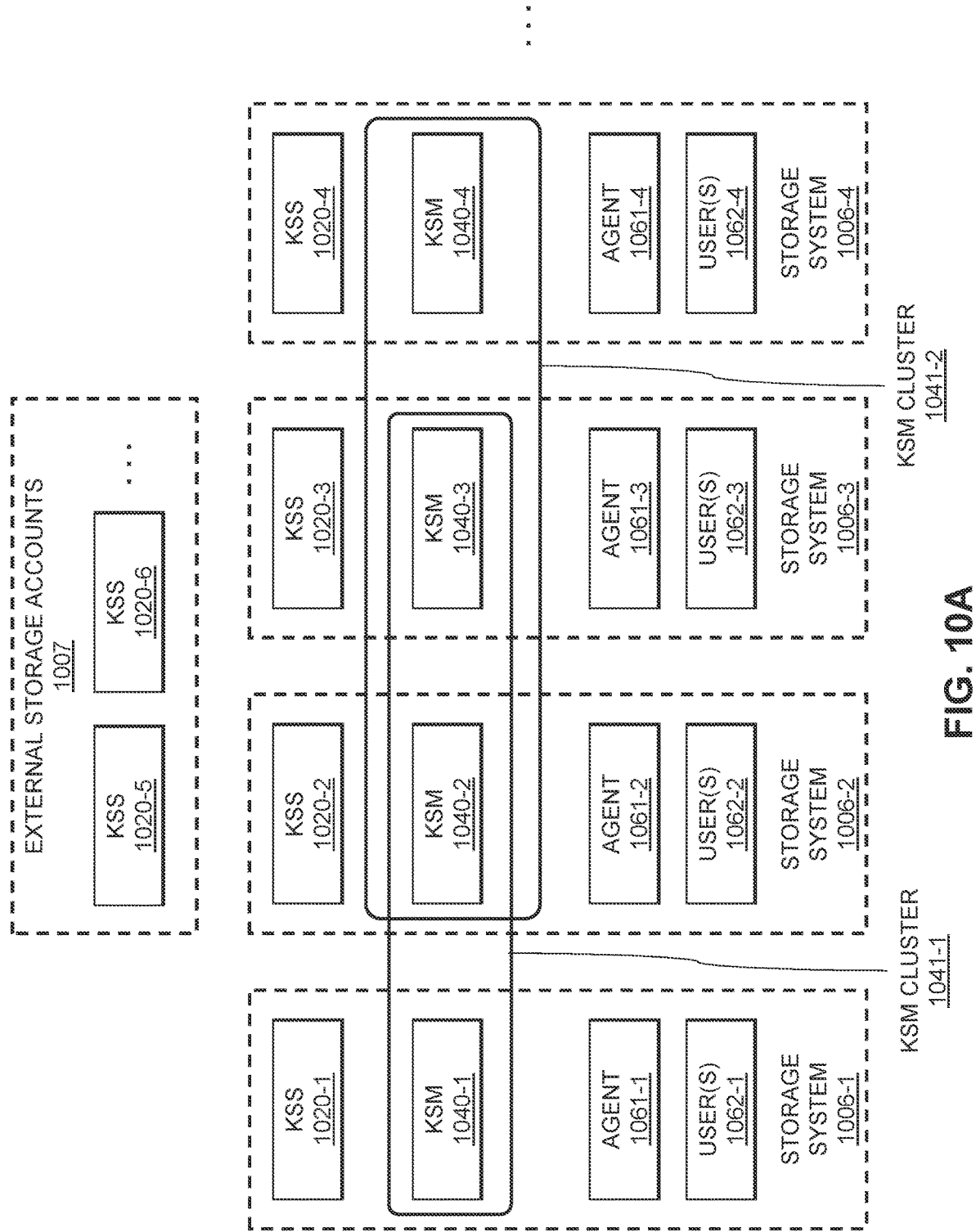
FIGS. 10A-10C show a distributed key and secret management system with dynamic clustering deployed on a clustered storage system in an illustrative embodiment.
Figure 10B:
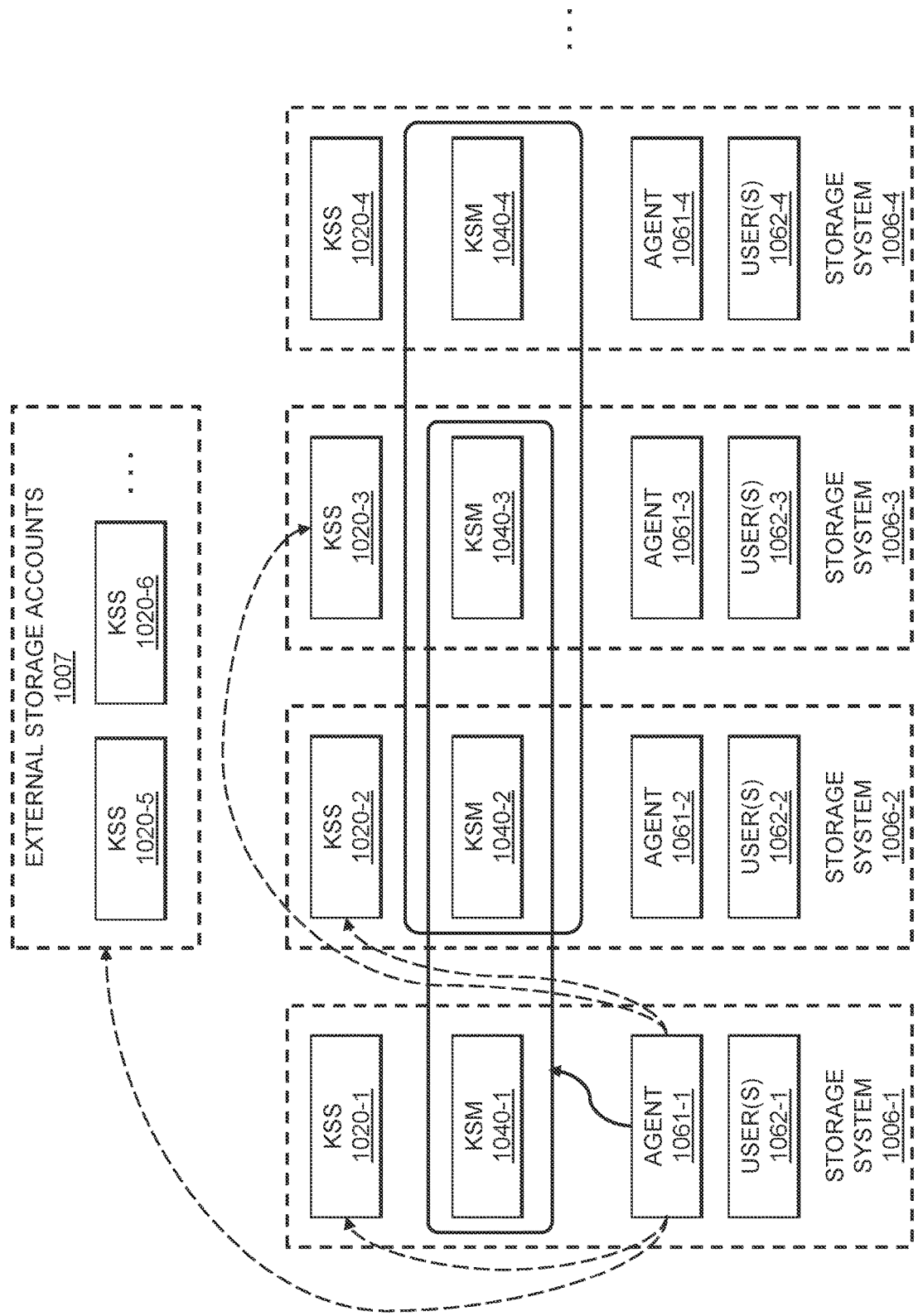
Figure 10C:
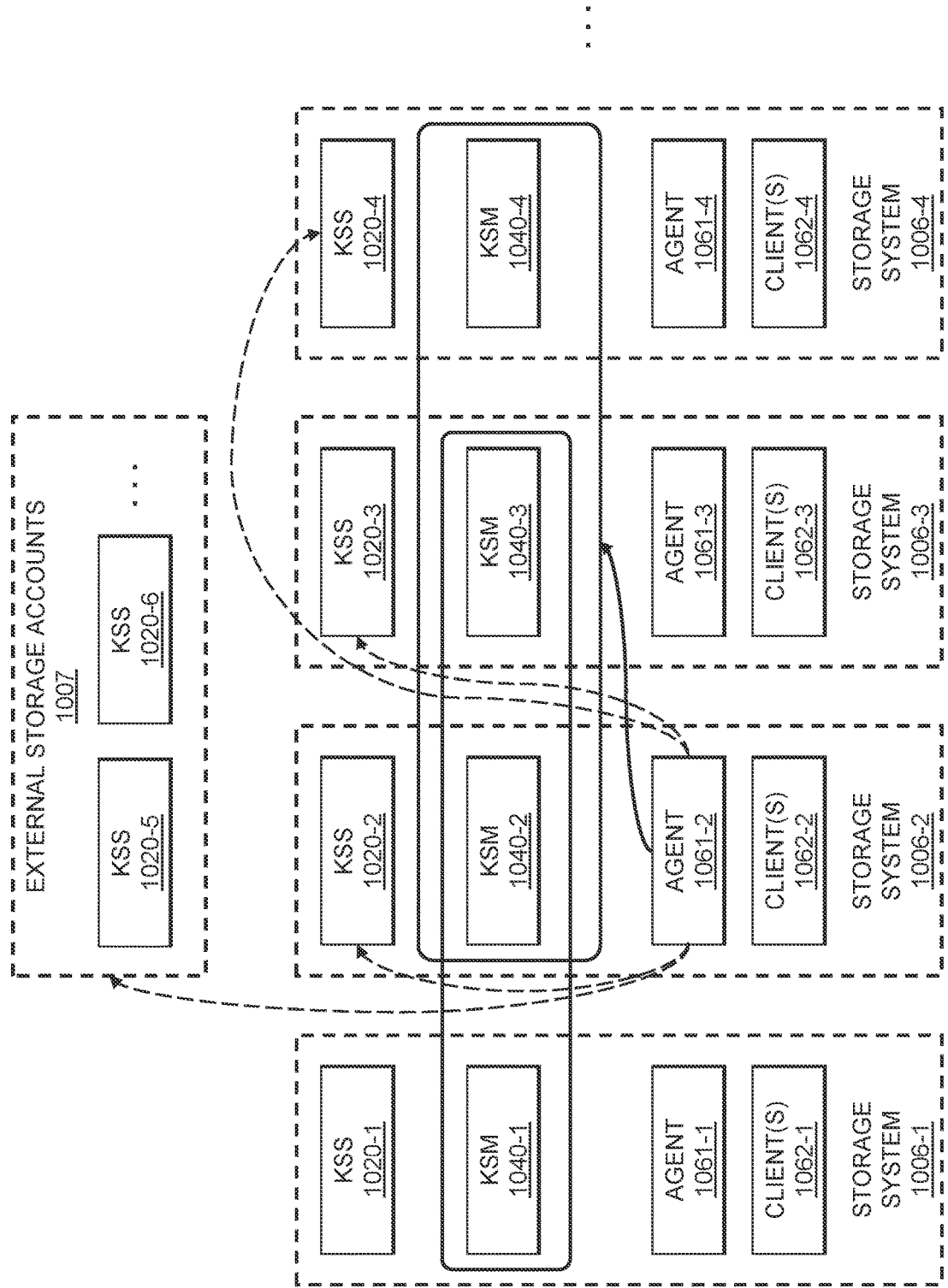

FIGS. 10A-10C depict deployment of a D-KSMS with DC in a clustered storage system comprising storage systems 1006-1 through 1006-4 (collectively, storage systems 1006). The storage systems 1006-1 through 1006-4 include respective sets of users or clients 1062-1 through 1062-4 (collectively, clients 1062), agents 1061-1 through 1061-4 (collectively, agents 1061), KSSs 1020-1 through 1020-4, and KSMs 1040-1 through 1040-4 (collectively, KSMs 1040). FIGS. 10A-10C also show a set of external storage accounts 1007 including KSSs 1020-5 and 1025-6. The KSSs 1020-1 through 1020-6 are collectively referred to as KSSs 1020. It should be appreciated that the particular number of storage systems 1006 in a clustered storage system may vary, including clustered storage systems with fewer than four or greater than four storage systems. Further, the number of KSSs provided using external storage accounts 1007 may vary (e.g., there may be none, more than two, etc.). Still further, while FIGS. 10A-10C illustrate each of the storage systems 1006 implementing only a single KSM 1040 instance and KSS 1020 instance, this is not a requirement. Some of the storage systems 1006, for example, may include multiple embedded KSSs and/or KSMs, as well as potentially multiple agents and distinct sets of users.

As shown in FIG. 10A, the KSMs 1040 are arranged in two KSM clusters 1041-1 and 1041-2 (collectively, KSM clusters 1041). As shown in FIG. 10B, the agent 1061-1 of storage system 1006-1 accesses the KSM cluster 1041-1, as well as a set of KSSs including KSS 1020-1, 1020-2, 1020-3 and the KSSs 1020-5 and 1020-6 that are part of the external storage accounts 1007. As shown in FIG. 10C, the agent 1061-2 of storage system 1006-2 accesses the KSM cluster 1041-2, as well as a set of KSSs including KSS 1020-3, 1020-3, 1020-4 and the KSSs 1020-5 and 1020-6 that are part of the external storage accounts 1007. Although not explicitly shown, the agents 1061-3 and 1061-4 of storage systems 1006-3 and 1006-4 may access other KSM clusters (or one of the KSM clusters 1041-1 and 1041-2), and sets of the KSSs 1020.

In the clustered storage system shown in FIGS. 10A-10C, each of the storage systems 1006 has an embedded KSS and an embedded KSM. For example, storage system 1006-1 includes embedded KSS 1020-1 and embedded KSM 1040-1. For key and secret store flexibility, external storage accounts 1007 may provide additional KSSs (e.g., KSSs 1020-5 and 1020-6) for storage of key and secret materials. It should be noted, however, that the use of external storage accounts 1007 for the clustered storage system shown in FIGS. 10A-10C is optional. Without the use of the external storage accounts 1007, there would be a minimum of four active storage systems 1006 required to support keys and secrets that are split into two parts with two copies of each being stored. With the use of the external storage accounts 1007, there would be a minimum of two active storage systems 1006 to support KSM redundancy.

Figure 11:
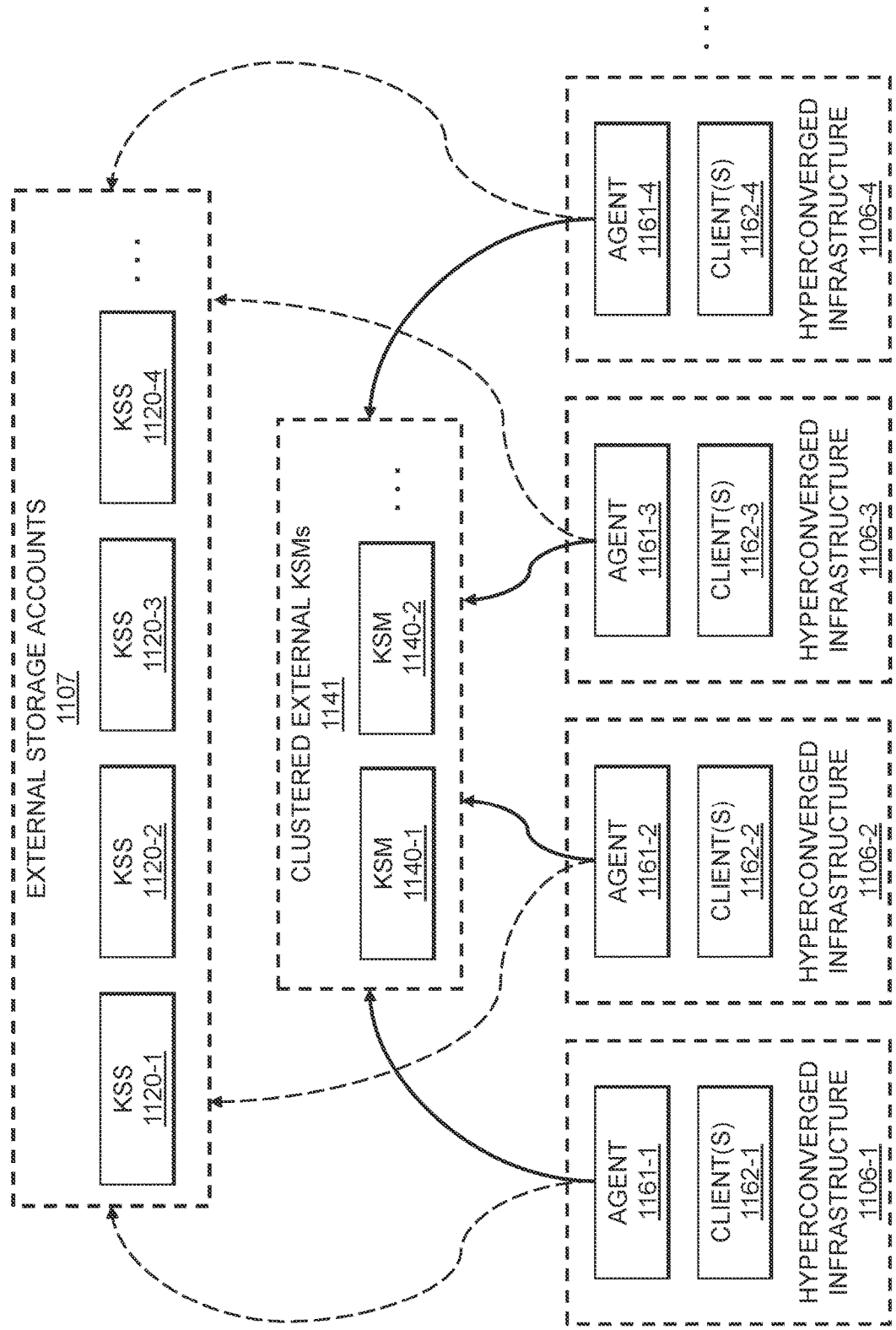
FIG. 11 shows a distributed key and secret management system with dynamic clustering deployed on a clustered storage system in an illustrative embodiment.

FIG. 11 illustrates a D-KSMS with DC deployed in a distributed HCI environment including HCIs 1106-1 through 1106-4 (collectively, HCIs 1106). The HCIs 1106-1 through 1106-4 include respective sets of users or clients 1162-1 through 1162-4 and agents 1161-1 through 1161-4. When multiple HCI systems (e.g., HCIs 1106-1 through 1106-4) are federated together, the D-KSMS with DC can be deployed across HCI federations. In the FIG. 11 embodiment, the HCIs 1106-1 through 1160-4 do not utilize embedded KSSs or embedded KSMs. Instead, clustered external KSMs 1141 including KSM instances 1140-1 and 1140-2 (collectively, KSMs 1140) are used, as well as KSSs 1120-1 through 1120-4 (collectively, KSSs 1120) provided using external storage accounts 1107. It should be noted that the particular number of HCIs 1106, agents 1161, clients 1162, KSMs 1140 and KSSs 1120 shown in FIG. 11 are presented by way of example only, and that other numbers of such elements may be used in other embodiments. Further, it is possible that in some embodiments one or more of the HCIs 1106 may include one or more embedded KSSs and/or embedded KSMs. As shown in FIG. 11, each of the agents 1161 is configured to access the clustered external KSMs 1141 and KSSs 1120 of the external storage accounts 1107.

Consider, as a further exemplary use case, a financial institution such as a bank that could have hundreds or thousands of branches. A D-KSMS with DC system may embed functional entities (e.g., agents, KSMs, KSSs, etc.) in each branch to provide a true distributed and secure solution for key or secret management. Similarly, a D-KSMS with DC system may be deployed in other use cases where it is desired to provide distributed and secure key or secret management.

Illustrative embodiments provide a number of advantages relative to conventional approaches. The D-KSMS with DC systems described herein can advantageously be scaled linearly to support a wide range of numbers of clients or client clusters (e.g., from several clients to hundreds and thousands of clients and beyond). Further, the D-KSMS with DC systems described herein provide security, in that no single entity (e.g., no single KSM or KSS instance) can leak client data. Further, the D-KSMS with DC systems described herein are flexible, in that all functional entities can be embedded locally in client processing platforms, can be located externally to client processing platforms, be mixed locally and externally relative to client processing platforms, etc.

Dynamic KSM clusters may be generated for each client or client cluster platform to provide secure key and secret management services to that client or client cluster platform. The dynamic KSM clusters further provide HA, in that any KSM in a KSM cluster can serve the client. Also, as the KSMs in the KSM clusters store metadata only, the dynamic KSM clusters provide security. Client key and secret data is illustratively spread across multiple KSS entities, and only the client can get the key and secret data (e.g., a complete key or secret). KSM clusters are also advantageously dynamic and self-maintained, as the KSMs are configured to locate clustering peers automatically and reliably. In embodiments where KSMs are embedded in client processing platforms, the KSMs are easily managed and require no external resources while providing compatible key and secret management services as reliable external KSMs. Further, high performance KSMs can provide local accessibility most of the time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for clustering data management entities distributed across a plurality of processing nodes will now be described in greater detail with reference to FIGS. 12 and 13. Although described in the context of system 100, these platforms may also be used to implement at least portions of other information processing systems in other embodiments.

Figure 12:
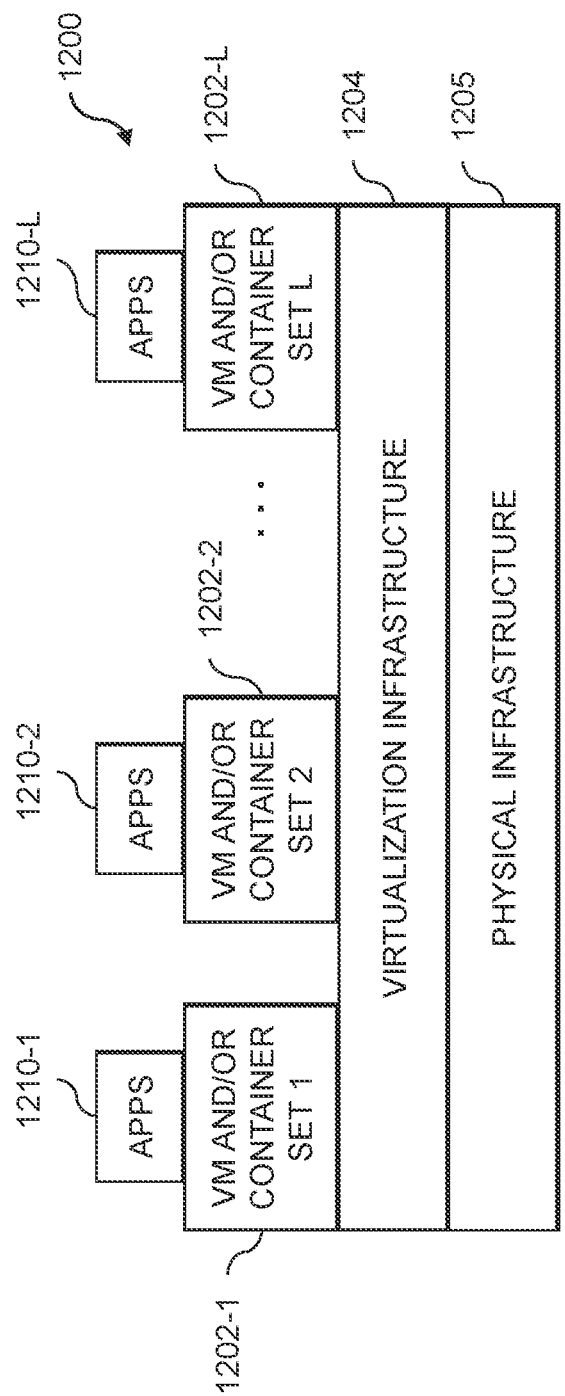
FIGS. 12 and 13 show examples of processing platforms that may be utilized to implement at least a portion of an information processing system in illustrative embodiments.
Figure 13:
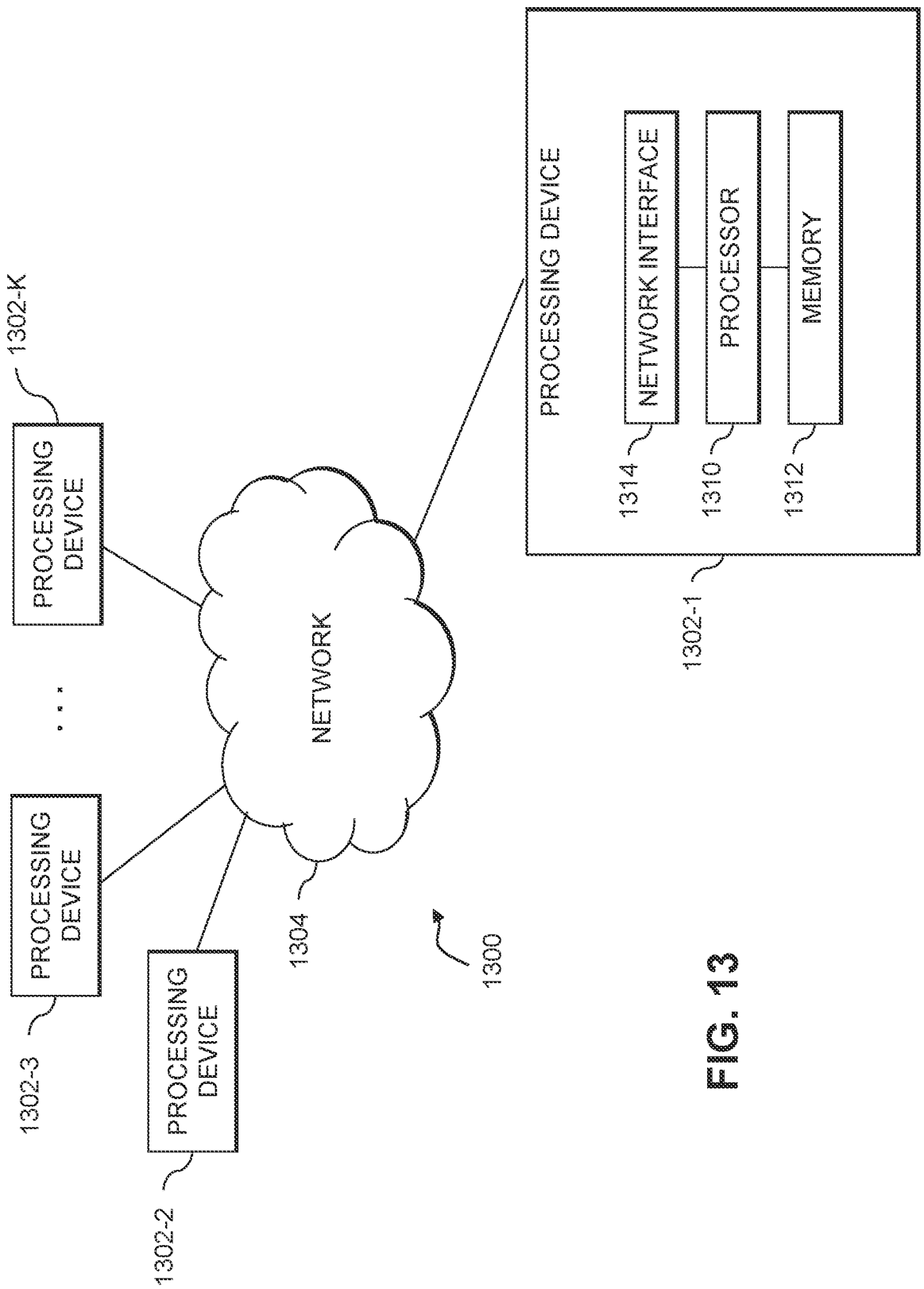

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, ... 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for clustering data management entities distributed across a plurality of processing nodes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, secrets, replication policies, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
receiving, at a given one of a plurality of data management entities running on a given one of a plurality of distributed processing nodes, a request to create a given cluster of data management entities for a given one of a plurality of clients, the plurality of data management entities being configured to manage storage and retrieval of data items on behalf of the plurality of clients;

determining a set of membership requirements for the given cluster of data management entities;

discovering one or more additional ones of the plurality of data management entities running on one or more additional ones of the plurality of distributed processing nodes;

selecting at least one of the one or more additional data management entities for membership in the given cluster of data management entities based at least in part on the determined set of membership requirements;

establishing a replication relationship for automating sharing of metadata between the given data management entity and the selected at least one additional data management entity, the metadata comprising (i) access information for a subset of a plurality of data stores where portions of one or more data items of the given client are stored and (ii) location information specifying which of the data stores in the subset of the plurality of data stores store which portions of the one or more data items of the given client; and performing one or more data management functions for the given client utilizing at least a portion of the metadata.

2. The apparatus of claim 1 wherein the one or more data items of the given client comprise one or more keys.

3. The apparatus of claim 1 wherein the one or more data items of the given client comprise one or more secrets.

4. The apparatus of claim 1 wherein the given data management entity cluster comprises one of a plurality of different data management entity clusters comprising respective different subsets of the plurality of data management entities, each of the plurality of data management entity clusters being associated with at least one of the plurality of clients.

5. The apparatus of claim 4 wherein the given data management entity is a member of the given data management entity cluster and at least one other one of the plurality of data management entity clusters.

6. The apparatus of claim 1 wherein:
the plurality of distributed processing nodes comprise storage systems in a clustered storage system;
each of at least a subset of the storage systems in the clustered storage system: runs one of the plurality of data management entities; implements one of the plurality of data stores; and
comprises one of the plurality of clients; and
at least one of the plurality of data stores is implemented using one or more storage systems external to the clustered storage system.

7. The apparatus of claim 1 wherein each of the plurality of clients is associated with one of a plurality of hyperconverged infrastructure nodes in a federated hyperconverged infrastructure environment, and wherein the plurality of data management entities and the plurality of data stores are implemented external to the plurality of hyperconverged infrastructure nodes in the federated hyperconverged infrastructure environment.

8. The apparatus of claim 1 wherein the determined set of membership requirements comprises a requirement that each data management entity in the given data management entity cluster has at least a threshold level of connectivity to each of at least a subset of the other data management entities in the given data management entity cluster.

9. The apparatus of claim 1 wherein the determined set of membership requirements comprises:
a designated amount of available storage, the designated amount of available storage for each data management entity in the given data management entity cluster being based at least on part on a number of different data management entity clusters which that data management entity is a member of; and
a maximum number of different data management entity clusters to which each data management entity in the given data management entity cluster may be a member of.

10. The apparatus of claim 1 wherein automating the sharing of the metadata between the given data management entity and the selected at least one additional data management entity comprises:
maintaining, by the given data management entity, a table of changes for a metadata database local to the given data management entity;
packaging a set of two or more of the changes in the table of changes into one or more batches of changes;
performing, at a first time, synchronous replication of the one or more batches of changes from the given data management entity to one or more other ones of the data management entities in the given data management entity cluster that the given data management entity is able to establish a connection with at the first time; and
performing, at a second time subsequent to the first time, asynchronous replication of the one or more batches of changes from the given data management entity to one or more other ones of the data management entities in the given data management entity cluster that that given data management entity is unable to establish the connection with at the first time.

11. The apparatus of claim 1 wherein at least a given one of the one or more data management functions for the given client is performed responsive to receiving a request from a given agent associated with the given client, and wherein the given agent also runs on the given processing node of the plurality of distributed processing nodes.

12. The apparatus of claim 1 wherein at least a given one of the one or more data management functions for the given client is performed responsive to receiving a request from a given agent associated with the given client, wherein the request from the given agent associated with the given client comprises a request to save a given one of the one or more data items, and wherein performing the given data management function for the given client comprises:
receiving, from the given client, a data item identifier associated with the given data item and a size of the given data item;
determining, at the given data management entity, whether to split the given data item into two or more data item parts;
responsive to determining to split the given data item into the two or more data item parts, selecting two or more of the data stores in the subset of the plurality of data stores on which to store respective copies of each of the two or more data item parts; and
providing, to the given client, an indication of which of the two or more data stores in the subset of the plurality of data stores to utilize for storage of the respective copies of each of the two or more data item parts.

13. The apparatus of claim 1 wherein at least a given one of the one or more data management functions for the given client is performed responsive to receiving a request from a given agent associated with the given client, wherein the request from the given agent associated with the given client comprises a request to retrieve a given one of the one or more data items, and wherein performing the given data management function for the given client comprises:

receiving, from the given client, a data item identifier associated with the given data item;

determining, at the given data management entity, whether the given data item has been split into two or more data item parts;

responsive to determining that the given data item is split into the two or more data item parts, identifying two or more of the data stores in the subset of the plurality of data stores on which respective copies of each of the two or more data item parts are stored; and providing, to the given client, an indication of which of the two or more data stores in the subset of the plurality of data stores store the respective copies of each of the two or more data item parts.

14. The apparatus of claim 1 wherein performing a given one of the one or more data management functions comprises controlling replication of one or more data items of the given client across the data stores in the subset of the data stores in accordance with one or more specified data item replication policies.

15. The apparatus of claim 14 wherein the one or more specified data item replication policies comprise at least one of:

replicating the one or more data items in data stores of two or more data store availability zones;

replicating the one or more data items in data stores in two or more different geographic locations; and a scale of replication of the one or more data items, the scale of replication being based at least in part on at least one of a number of clients associated with the given data management entity cluster, a number of the two or more data store availability zones, and a number of data item parts to which respective ones of the one or more data items are split into.

16. The apparatus of claim 1 wherein content of one or more data items of the given client are stored on the subset of the data stores but not data management entities in the given data management entity cluster.

17. A computer program product comprising a non-transitory processor-readable storage medium having stored therein program code of one or more software programs, wherein the program code when executed by at least one processing device causes the at least one processing device to perform steps of:

receiving, at a given one of a plurality of data management entities running on a given one of a plurality of distributed processing nodes, a request to create a given cluster of data management entities for a given one of a plurality of clients;

determining a set of membership requirements for the given cluster of data management entities;

discovering one or more additional ones of the plurality of data management entities running on one or more additional ones of the plurality of distributed processing nodes;

selecting at least one of the one or more additional data management entities for membership in the given cluster of data management entities based at least in part on the determined set of membership requirements;

establishing a replication relationship for automating sharing of metadata between the given data management entity and the selected at least one additional data management entity, the metadata comprising (i) access information for a subset of a plurality of data stores where portions of one or more data items of the given client are stored and (ii) location information specifying which of the data stores in the subset of the plurality of data stores store which portions of the one or more data items of the given client; and performing one or more data management functions for the given client utilizing at least a portion of the metadata.

18. The computer program product of claim 17 wherein content of one or more data items of the given client are stored on the subset of the data stores but not data management entities in the given data management entity cluster.

19. A method comprising:

receiving, at a given one of a plurality of data management entities running on a given one of a plurality of distributed processing nodes, a request to create a given cluster of data management entities for a given one of a plurality of clients;

determining a set of membership requirements for the given cluster of data management entities;

discovering one or more additional ones of the plurality of management entities running on one or more additional ones of the plurality of distributed processing nodes;

selecting at least one of the one or more additional data management entities for membership in the given cluster of data management entities based at least in part on the determined set of membership requirements;

establishing a replication relationship for automating sharing of metadata between the given data management entity and the selected at least one additional data management entity, the metadata comprising (i) access information for a subset of a plurality of data stores where portions of one or more data items of the given client are stored and (ii) location information specifying which of the data stores in the subset of the plurality of data stores store which portions of the one or more data items of the given client; and performing one or more data management functions for the given client utilizing at least a portion of the metadata.

20. The method of claim 19 wherein content of one or more data items of the given client are stored on the subset of the data stores but not data management entities in the given data management entity cluster.

\* \* \* \* \*